US008938040B2

(12) United States Patent
Alexander et al.

(10) Patent No.: US 8,938,040 B2
(45) Date of Patent: Jan. 20, 2015

(54) IMPROVING RECEIVER PERFORMANCE IN A COMMUNICATION NETWORK

(75) Inventors: Paul Dean Alexander, Prospect (AU); Paul Kingsley Gray, Tusmore (AU); David Victor Lawrie Haley, Stepney (AU); John Lawrence Buetefuer, Para Hills (AU); Alexander James Grant, North Adelaide (AU); Phuc Ngoc Pham, Prospect (AU); Joshua Charles Sutton, Maylands (AU); Martin Suter, Kent Town (AU)

(73) Assignee: Cohda Wireless Pty. Ltd. (AU)

( * ) Notice: Subject to any disclaimer, the term of this patent is extended or adjusted under 35 U.S.C. 154(b) by 928 days.

(21) Appl. No.: 12/444,279

(22) PCT Filed: Oct. 5, 2007

(86) PCT No.: PCT/AU2007/001506
§ 371 (c)(1),
(2), (4) Date: Nov. 30, 2009

(87) PCT Pub. No.: WO2008/040088
PCT Pub. Date: Apr. 10, 2008

(65) Prior Publication Data
US 2010/0091920 A1    Apr. 15, 2010

(30) Foreign Application Priority Data

Oct. 5, 2006   (AU) ................................ 2006905545
Oct. 10, 2006  (AU) ................................ 2006905618

(51) Int. Cl.
*H04B 1/10*  (2006.01)
*H04L 1/00*  (2006.01)
(Continued)

(52) U.S. Cl.
CPC ............ *H04L 1/0045* (2013.01); *H04L 1/0059* (2013.01); *H04L 25/0204* (2013.01);
(Continued)

(58) Field of Classification Search
CPC . H04L 1/0045; H04L 1/0047; H04L 25/0202; H04L 25/0222; H04L 25/03318; H04L 27/2647
USPC ......... 375/229, 230, 232, 316, 340, 346, 349, 375/350
See application file for complete search history.

(56) References Cited

U.S. PATENT DOCUMENTS 6,141,373 A * 10/2000  Scott ............................. 375/150
6,912,258 B2 * 6/2005  Birru ............................ 375/340
(Continued)

FOREIGN PATENT DOCUMENTS

EP   0838928 A2   4/1998
EP   1361719 A2   11/2003
(Continued)

OTHER PUBLICATIONS

"European Application Serial No. 07815312.9, Supplementary European Search Report mailed Nov. 24, 2011", 12 pgs.
(Continued)

*Primary Examiner* — David B. Lugo
(74) *Attorney, Agent, or Firm* — Schwegman Lundberg & Woessner, P.A.

(57)  ABSTRACT

Methods and apparatus are described for improving receiver performance in a multicarrier communication network in which an encoded symbol (250) is transmitted over a transmission channel (20) in the communications system. A model of the transmission channel (20) is estimated (718, 760), said model characterizing an effect of intercarrier interference on at least one carrier in the multicarrier system. The received symbol (250) is decoded (720, 762) using the estimated model to remove a predicted effect of intercarrier interference. A pre-processor (40) is also described for operation in conjunction with a communications receiver (30) in the network. The pre-processor (40) includes a channel estimator (42) operable to estimate at least one feature of the communication channel based on a received signal. The pre-processor (40) modifies the received signal dependent on the at least one estimated feature and provides the modified signal to the communications receiver (30).

44 Claims, 17 Drawing Sheets

(51) Int. Cl.
  *H04L 25/02* (2006.01)
  *H04L 25/03* (2006.01)
  *H04L 27/26* (2006.01)
(52) U.S. Cl.
  CPC .......... *H04L25/022* (2013.01); *H04L 25/0224* (2013.01); *H04L 25/03318* (2013.01); *H04L 27/2647* (2013.01); *H04L 1/0047* (2013.01)
  USPC ............................ 375/350; 375/232; 375/340

(56) References Cited

U.S. PATENT DOCUMENTS

| | | | |
|---|---|---|---|
| 7,010,027 | B1 | 3/2006 | Mestdagh et al. |
| 7,042,937 | B2 | 5/2006 | Birru |
| 7,308,052 | B2 * | 12/2007 | Cheng et al. .................. 375/340 |
| 7,388,910 | B2 * | 6/2008 | McKown ....................... 375/232 |
| 7,551,679 | B2 * | 6/2009 | Liu et al. ....................... 375/260 |
| 7,961,824 | B2 | 6/2011 | Okazaki |
| 8,031,794 | B2 * | 10/2011 | Mostafa ........................ 375/267 |
| 8,170,470 | B2 * | 5/2012 | Park et al. .......................... 455/7 |
| 2002/0146078 | A1 | 10/2002 | Gorokhov et al. |
| 2003/0039203 | A1 | 2/2003 | Moon |
| 2003/0108127 | A1 | 6/2003 | Eilts et al. |
| 2005/0018794 | A1 * | 1/2005 | Tang et al. .................... 375/341 |
| 2005/0054366 | A1 * | 3/2005 | Chen et al. .................... 455/522 |
| 2005/0063345 | A1 * | 3/2005 | Wu et al. ....................... 370/335 |
| 2006/0002487 | A1 * | 1/2006 | Kriedte et al. ................ 375/267 |
| 2006/0023798 | A1 * | 2/2006 | Paek .............................. 375/260 |
| 2006/0274820 | A1 * | 12/2006 | Walton et al. ................. 375/148 |
| 2007/0270273 | A1 * | 11/2007 | Fukuta et al. ................. 475/206 |

FOREIGN PATENT DOCUMENTS

| | | |
|---|---|---|
| EP | 1370017 A1 | 12/2003 |
| EP | 1594259 A1 | 11/2005 |
| JP | 2003-051802 A | 2/2003 |
| JP | 2004-530365 A | 9/2004 |
| JP | 2004-328797 A | 11/2004 |
| JP | 2004-343546 A | 12/2004 |
| WO | WO-2005/071911 | 8/2005 |
| WO | WO-2006/092877 A1 | 9/2006 |

OTHER PUBLICATIONS

"International Application Serial No. PCT/AU2007/001506, International Preliminary Report on Patentability dated Apr. 7, 2009", 5 pgs.
LAN MAN Standards Committee of the IEEE Computer Society:, "Part 11: Wireless LAN Medium Access Contol (MAC) and Physical Layer (PHY) Specifications", Information technology—Telecommunications and information exchange systems—Local and metropolitan area networks—Specific requirements, *ANSI/IEEE Std. 802.11, 1999 Edition (R2003)* [online]. [retrieved Nov. 14, 2011]. Retrieved from the Internet: <URL: http://ieeexplore.ieee.org/stamp/stamp.jsp?tp=&arnumber=1389197&tag=1>, (1999), 34 pgs.
"International Application Serial No. PCT/AU2007/001506, International Search Report mailed Nov. 29, 2007", 3 pgs.
"International Application Serial No. PCT/AU2007/001506, Written Opinion mailed Nov. 29, 2007", 4 pgs.
"Chinese Application No. 200780041874X, Second Office Action dated Jan. 23, 2013 [with English translation]", (Jan. 23, 2013), 6 pgs.
"Chinese Application No. 200780041874X, Third Office Action dated Oct. 10, 2013 [with English translation]", (Oct. 10, 2013), 8 pgs.
"Japanese Application No. 2009-530737, Office Action mailed Nov. 26, 2013 [with English translation]", (Nov. 26, 2013), 4 pgs.
"Korean Application No. 10-2009-7009379, Office Action mailed Sep. 30, 2013 [with English translation]", (Sep. 30, 2013), 10 pgs.
"Canadian Application Ser. No. 2,667,026, Office Action mailed Feb. 27, 2014", 3 pgs.

* cited by examiner

IMPROVING RECEIVER PERFORMANCE IN A COMMUNICATION NETWORK

RELATED APPLICATIONS

This application is a nationalization under 35 U.S.C. 371 of PCT/AU2007/001506, filed Oct. 5, 2007 and published as WO 2008/040088 A1 on Apr. 10, 2008, which claimed priority under 35 U.S.C. 119 to Australian Patent Application Serial No. 2006905545, filed Oct. 5, 2006, and Australia Patent Application Serial No. 2006905618, filed Oct. 10, 2006; which applications and publication are incorporated herein by reference and made a part hereof.

FIELD OF THE INVENTION

The present invention relates to communication systems and, in particular, to enhancing the performance of receivers in a communication network.

BACKGROUND OF THE INVENTION

Communication systems may be modelled in terms of a transmitter 10 and receiver 30, separated by a channel 20, as shown in FIG. 1. The transmitter 10 transforms the data into a signal suitable for transmission over the channel 20. The channel may distort the transmitted signal in some way. The receiver's goal is to remove the effects of the channel distortions from the signal and to transform the signal into an estimate of the original data.

The receiver may include a Channel Estimator. The Channel Estimator may observe a received signal that has been distorted by transmission over the channel, and generate a channel estimate based upon this observation. Channel distortions may include amplitude distortions, frequency offsets, phase offsets, Doppler effects, or distortions resulting from a channel with memory, such as Rayleigh fading, Rician fading, or multipath channels, or additive noise or interference. The receiver may use the channel estimate to remove the effect of the channel and generate an estimate of the data that was transmitted.

In an ideal receiver (a.k.a. a Genie-aided receiver) the channel estimate would be perfect, and the estimate of the transmitted data would be optimal. However, in practice channel estimates may not be perfect, so the estimate of the transmitted data may be sub-optimal. Furthermore, many receivers are designed for operation over a narrow range of channel types. If these receivers are used to receive data transmitted over types of channels they were not designed for, then their channel estimators may be more likely to generate erroneous channel estimates, thereby degrading performance.

The Digital Video Broadcast Handheld (DVB-H) standard, published by the European Telecommunications Standard Institute (ETSI), extends the terrestrial standard (DVB-T). DVB-H aims to specify an efficient means for broadcasting multimedia services to battery-powered handheld terminals. DVB-H is backward compatible with its terrestrial predecessor.

The standards are published as follows:

Digital video broadcasting (DVB); transmission system for handheld terminals (DVB-H), ETSI EN 302 304 V1.1.1 (2004-11), European Telecommunications Standards Institute; and Digital video broadcasting (DVB); framing structure, channel coding and modulation for digital terrestrial television, ETSI EN 300 744 V1.5.1 (2004-11), European Telecommunications Standards Institute.

Aims of the DVB-H standard include:
Robust mobile connectivity;
Maximization of coverage;
Low power consumption;
Mitigation of impulse interference; and
User roaming between cells.

With these aims in mind, the standard includes the components described in Table 1.

TABLE 1

DVB-H Specific Components

| Component | Layer | Mandatory/Optional | Stated Aim |
|---|---|---|---|
| Time-Slicing | Link | Mandatory | Reduce average power consumption and allow seamless handover. |
| DVB-H Signalling | PHY | Mandatory | Fast service discovery and handover. |
| MPE-FEC | Link | Optional | Improve C/N and Doppler performance in mobile channels, and improve tolerance to impulse interference. |
| 4K Mode | PHY | Optional | Trade-off mobility and SFN size. |
| In-depth Symbol Interleaver | PHY | Optional | Improved robustness for 2K, 4K modes. |

When mobility is present the DVB waveform may suffer from Inter-Carrier Interference (ICI) where, due to mobility-induced Doppler, subcarriers interfere with each other.

To address this problem the DVB-H standard extends DVB-T by addition of a "4K" mode to the 2K and 8K modes. The number here refers to the number of subcarriers in the FFT used to generate the transmitted DVB waveform. For a given bandwidth signal more subcarriers means closer subcarriers and higher vulnerability to Doppler. The 8K mode is particularly vulnerable to Doppler. The 4K mode is seen as a compromise between wider subcarriers, as offered by the 2K mode, and the longer cyclic prefix offered by the 8K mode.

DVB also has a hierarchical mode where a waveform may be demodulated in two ways. One method results in more reliable demodulation at a lower data rate and the other is more difficult to demodulate but results in higher data rates. An ability to demodulate in higher data rate modes offers improved service to end users.

Pilot symbols are inserted in the transmitted waveform in order to enable channel estimation for coherent demodulation and decoding at the receiver. Approximately $\frac{1}{6}^{th}$ of the subcarriers, in any given Orthogonal Frequency-Division Multiplexing (OFDM) symbol, are used for this purpose in DVB. At the limits of coverage and mobility the ability of a receiver, using these pilots alone, to derive an accurate channel estimate is compromised.

Reference to any prior art in the specification is not, and should not be taken as, an acknowledgement or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

It is an object of the present invention to substantially overcome, or at least ameliorate, one or more disadvantages of existing arrangements.

According to a first aspect of the invention there is provided a pre-processor for operation in conjunction with a communications receiver, the pre-processor comprising:
- an input operable to receive an input signal that is transmitted via a communication channel;
- a channel estimator operable to estimate at least one feature of the communication channel based on the input signal;
- a signal modifier operable to modify the input signal dependent on the at least one estimated feature; and
- an output for providing the modified signal to the communications receiver.

According to a second aspect of the invention there is provided a method of pre-processing a signal for provision to a communications receiver, said method comprising:
- receiving an input signal that is transmitted via a communication channel;
- estimating at least one feature of the communication channel based on the input signal;
- modifying the input signal dependent on the at least one estimated feature; and
- providing the modified signal to the communications receiver.

According to a further aspect of the invention there is provided a computer program product comprising machine-readable program code recorded on a machine-readable recording medium, for controlling the operation of a data processing apparatus on which the program code executes to perform a method of pre-processing a signal for provision to a communications receiver, said method comprising:
- receiving an input signal that is transmitted via a communication channel;
- estimating at least one feature of the communication channel based on the input signal;
- modifying the input signal dependent on the at least one estimated feature; and
- providing the modified signal to the communications receiver.

A communications system incorporating the pre-processor is also described.

According to a further aspect of the invention there is provided a method of decoding a symbol in a multicarrier communications system, comprising:
a) receiving an encoded symbol transmitted over a transmission channel in the communications system;
b) estimating a model of the transmission channel, said model characterising an effect of intercarrier interference on at least one carrier in the multicarrier system and
c) decoding the received symbol using the estimated model to remove a predicted effect of intercarrier interference.

According to a further aspect of the invention there is provided a method of intercarrier interference prediction and removal in a receiver for a multicarrier wireless communications system, including:
- estimating a first smoothed direct channel based on pilot symbols;
- decoding a received symbol using the first smoothed direct channel estimate to produce soft and hard transmitted symbol estimates;
- estimating a second smoothed direct channel using pilots and first hard transmitted symbol estimates;
- decoding the received symbol using the second smoothed direct channel estimate to produce first soft and second hard transmitted symbol estimates;
- estimating a third smoothed direct channel using pilot symbols and second hard transmitted symbol estimates; and
- estimating the smoothed intercarrier interference channels for at least the adjacent subcarriers having first removed the current estimate of direct channel interference from the observation using first soft transmitted symbol estimate.

Preferably, the method includes
- cancellation of interference from at least one subcarrier according to the channel estimates;
- decoding the interference cancelled subcarriers to return information bit estimates.

The method may additionally include combining, according to smooth channel estimates, the interference cancelled symbols before decoding.

The method may include one or more additional repetitions of
- estimating a new smoothed direct channel using pilot symbols and current hard decoder outcomes;
- estimating the smoothed intercarrier interference channels for at least the adjacent subcarriers having first removed the current estimate of direct channel interference from the observation using current soft transmitted symbol estimate;
- cancellation of interference from at least one subcarrier according to the channel estimates;
- decoding the received symbol using the smoothed direct channel estimate to produce new soft and hard transmitted symbol estimates;

Smoothing of the channel estimate may be achieved using either
- convolution by a low pass filter,
- transformation via an FFT, windowing and IFFT Generalisation to multiple receiver antenna may be achieved by defining a set of channels for each antenna and vectorising the demodulation stage of the decoding process.

The ICI present in the output of the FFT may also be reduced by feeding back local frequency offset estimates to a pre-FFT module that corrects the time domain sequence for the measured frequency offset. This correction may be done in a forward only manner or retrospectively, i.e. any given OFDM symbol may be transformed through the FFT multiple times if the frequency offset estimate changes during application of the receiver.

The use of soft output decoding of the convolutional code (e.g. via A-Posteriori Probability decoding) may be used to allow the use of erasure prediction ahead of any subsequent Reed-Solomon decoding thereby improving the error correction capability of the system.

According to another aspect of the invention there is provided a method of intercarrier interference prediction and removal in a receiver for a multicarrier wireless communications system, including;
- estimating a first smoothed direct channel based on pilot symbols;
- decoding a received symbol using the first smoothed direct channel estimate to produce soft and hard transmitted symbol estimates;
- estimating a next smoothed direct channel using pilot symbols and the hard transmitted symbol estimates; and
- estimating the smoothed intercarrier interference channels for at least adjacent subcarriers, preferably having first removed the current estimate of direct channel interference from the observation using the soft transmitted symbol estimate.

Preferably, the method includes
- cancellation of interference from at least one subcarrier according to the channel estimates;
- decoding the interference cancelled subcarriers to return information bit estimates.

BRIEF DESCRIPTION OF THE DRAWINGS

Embodiments of the present invention will now be described with reference to the drawings, in which.

DETAILED DESCRIPTION OF THE EMBODIMENTS

Pre-Processor

Embodiments of a pre-processor are described that may be placed before a communications receiver in a communications network to improve the performance of the receiver. The pre-processor modifies the communication channel observed by the receiver to better match the capability of the receiver.

The described pre-processor has potential application to:
  Wireless communications systems, e.g. DVB-T, DVB-H, IEEE 802.11, IEEE 802.16, 3GPP2;
  Satellite communications systems; and
  Wired communications systems, e.g. ADSL, HomePlug.

The described pre-processors may be paired with a range of existing communications receivers to improve receiver performance. In one arrangement, the pre-processor may be paired with an existing IEEE 802.11 receiver that is designed to operate on a non-mobile, indoor channel to enable the receiver to operate on a mobile, outdoor channel.

Figure 1:
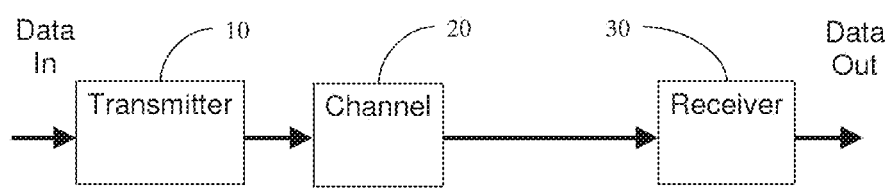
FIG. 1: is a schematic drawing of a communications system.
Figure 2:
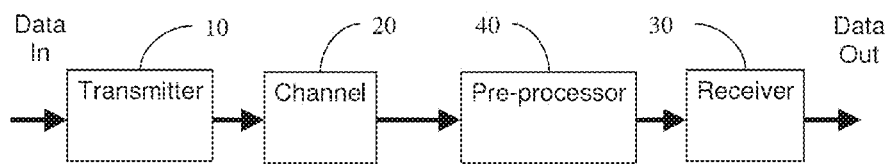
FIG. 2: is a schematic drawing of a communications system incorporating a Pre-Processor.

The pre-processors may be used to modify the signal input to the receiver in order to improve system performance. This is illustrated in FIG. 2. The Pre-Processor 40 takes the signal that has been affected by the channel 20 and processes the signal such that the signal output to the receiver 30 appears to have been affected by a different channel, where that channel is matched to the capabilities of the receiver 30. The use of the Pre-Processor 40 expands the range of channels that an existing receiver can operate with. In the cases where the existing receiver cannot be easily modified (such as when the existing receiver is an application specific integrated circuit (ASIC)), the receiver may fail to meet performance requirements on channels beyond its capabilities. In these cases the Pre-Processor 40 can be added prior to the existing receiver to expand the range of channels the receiver 30 can operate with.

The Pre-Processor 40 makes an estimate of the channel 20 based upon the received signal. It then uses this channel estimate to remove or modify the effect of the channel. A goal of the Pre-Processor 40 is to put the input to the receiver into such a form that the effective channel that the receiver observes is within the range that the receiver is capable of operating with.

Figure 3:
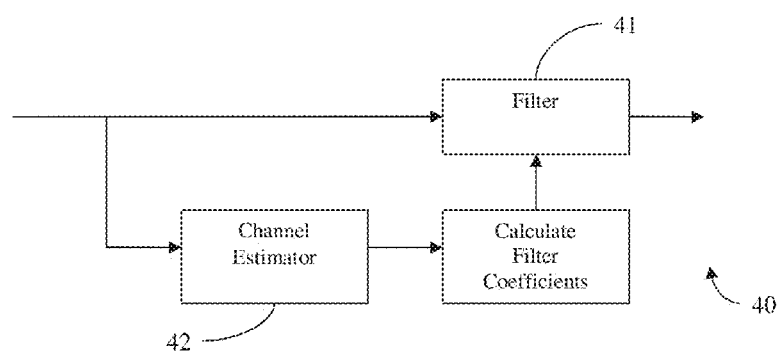
FIG. 3: is a schematic drawing of a time-domain Pre-Processor structure.

FIG. 3 shows a block diagram for the Pre-Processor 40 implemented in the time domain. Inputs to the pre-processor 40 are provided to a channel estimator 42 and a filter 41. Here the channel estimator 42 takes inputs that are in the time domain and the estimator output is used by module 39 to calculate the filter coefficients for a time domain filter 41 that modifies the received signal such that it appears to have been affected by a different channel than the actual channel in the communications system. The output of the filter 41 is provided to the receiver 30.

Figure 4:
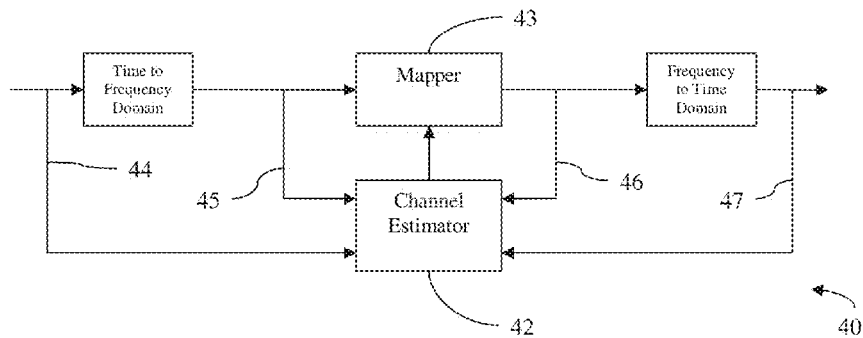
FIG. 4: is a schematic diagram of a frequency-domain Pre-Processor structure.

FIG. 4 shows a general block diagram for another Pre-Processor 40 implemented in the frequency domain. Here the received signal is that transformed from the time domain to the frequency domain. A mapper block 43 modifies the frequency domain signal such that it appears to have been affected by a different channel than the actual channel 20 in the communications system, and then this signal is transformed back to the time domain and output. The channel estimator 42 uses as input the received signal 44 in the time domain, or the received signal 45 in the frequency domain, or the received signal in both the time domain and the frequency domain 44, 45. The channel estimator 42 may optionally also use the mapped signal 46 in the frequency domain, or the mapped signal 47 in the time domain, or the mapped signal in both the frequency domain and the time domain 46, 47. The mapping performed by the mapper block 43 is based on the channel estimate generated by channel estimator 42.

Figure 5:
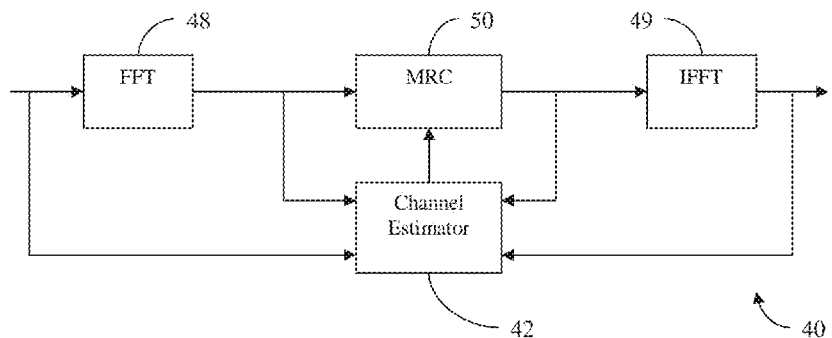
FIG. 5: shows a frequency domain Pre-Processor structure with a Maximum Ratio Combiner (MRC)

FIG. 5 shows a block diagram of a variant of the frequency domain Pre-Processor structure 40. Here the time domain to frequency domain transformation is performed using a fast Fourier transform (FFT) 48, and the frequency domain to time domain transformation is performed using an inverse fast Fourier transform (IFFT) 49. The frequency domain received signal is combined with the output of the channel estimator block 42 using a maximum ratio combiner (MRC) 50. The channel estimator 42 uses as input the received signal in the time domain, or the received signal in the frequency domain, or the received signal in both the time domain and the frequency domain. The channel estimator may optionally also use the MRC output signal in the frequency domain, or the MRC output signal in the time domain, or the MRC output signal in both the frequency domain and the time domain.

Figure 6:
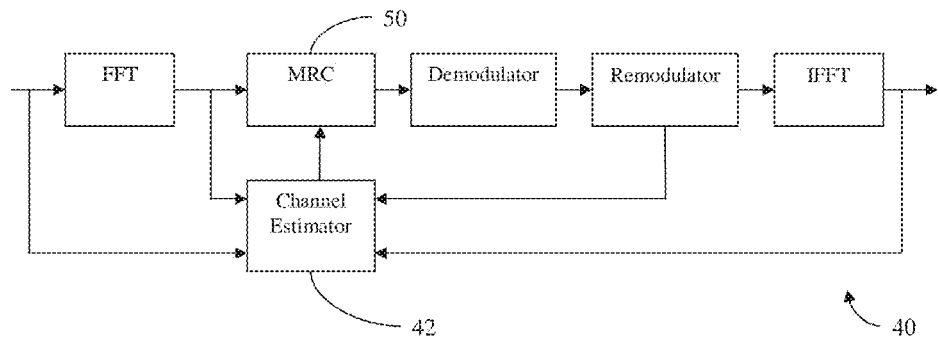
FIG. 6: shows a frequency domain Pre-Processor structure with demodulation.

FIG. 6 shows a block diagram of another variant of the frequency domain Pre-Processor structure. Here the modified input signal output by the MRC 50 in the frequency domain is first demodulated and then remodulated, before being used to direct the channel estimator 42. The channel estimator 42 uses as input the received signal in the time domain, or the received signal in the frequency domain, or the received signal in both the time domain and the frequency domain. The channel estimator may optionally also use the remodulated signal in the frequency domain, or the remodulated signal in the time domain, or the remodulated signal in both the frequency domain and the time domain.

Figure 7:
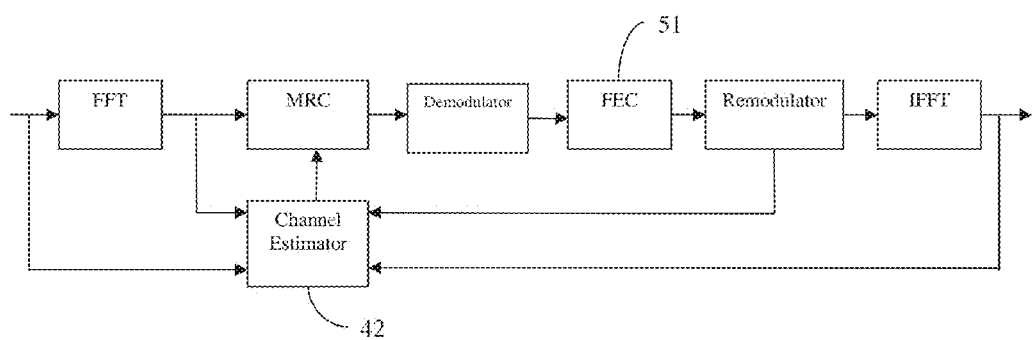
FIG. 7: shows a frequency domain Pre-Processor structure with Forward Error Correction (FEC) decoding.

FIG. 7 shows a block diagram of yet another variant of the frequency domain Pre-Processor structure. Here the modified input signal output by MRC 50 in the frequency domain is first demodulated, then decoded and re-encoded in the forward error control (FEC) block 51, and then remodulated, before being used to direct the channel estimator 42. The channel estimator 42 uses as input the received signal in the time domain, or the received signal in the frequency domain, or the received signal in both the time domain and the frequency domain. The channel estimator 42 may optionally also use the remodulated signal in the frequency domain, or the remodulated signal in the time domain, or the remodulated signal in both the frequency domain and the time domain.

In FIG. 5, FIG. 6, FIG. 7 the FFT 48 and IFFT 49 may be replaced with any form of time to frequency domain conversion, or frequency to time domain conversion, respectively. Also the MRC 50 may be replaced by any form of signal combiner, such as a minimum mean square error (MMSE) combiner, or zero forcing combiner.

An example of a channel 20 that the Pre-Processor 40 could be applied to is a frequency offset channel. A frequency offset channel introduces a frequency offset to the signal that is transmitted. If the receiver can accurately estimate the frequency offset then the effect of the channel can be removed. Consider the case of a receiver 30 that has been designed to operate with frequency offsets up to 10 kHz. If the frequency offset is, say, 100 kHz then the performance is likely to be very poor. If instead a channel estimator 42 is used in the Pre-Processor 40 that can cope with a frequency offset of 100 kHz, then the Pre-Processor could remove the effects of the channel. This would allow an existing receiver that can only cope with 10 kHz frequency offsets to be used on channels with frequency offsets of up to 100 kHz, thereby expanding the range of channels that the existing receiver can operate with.

Figure 8:
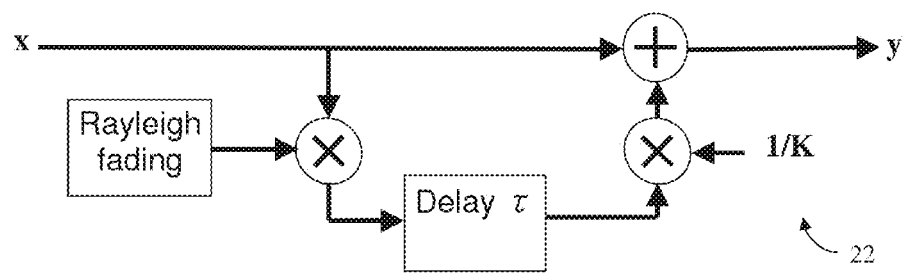
FIG. 8: is a schematic diagram of a satellite channel model.

Another example of a channel 22 that the Pre-Processor 40 could be applied to is a satellite channel. Satellite channels are characterised by Rician fading with path delay, as illustrated in FIG. 8. A typical maritime (i.e. ships at sea communicating via a geostationary satellite) satellite channel has a K-factor of 10 dB, a fading bandwidth of 0.7 Hz, and a path delay of 0 µs. A typical aeronautical (i.e. planes in the air communicating via a geostationary satellite) satellite channel may have a K-factor of 20 dB, a fading bandwidth of 100 Hz, and a path delay of 15 µs. A receiver designed for operation with a maritime satellite channel may not cope with the harsher aeronautical satellite. In this case a Pre-Processor 40 can be added prior to a receiver 30 designed for maritime satellite channels to allow the receiver 30 to perform well on an aeronautical satellite channel.

Yet another example channel 24 that the Pre-Processor 40 could be applied to is the channel experienced by IEEE 802.11a radios, described for example in IEEE 802.11 WG, "IEEE 802.11 Wireless Local Area Networks (WLAN)," http://grouper.ieee.org/groups/802/11/.

Figure 9A:
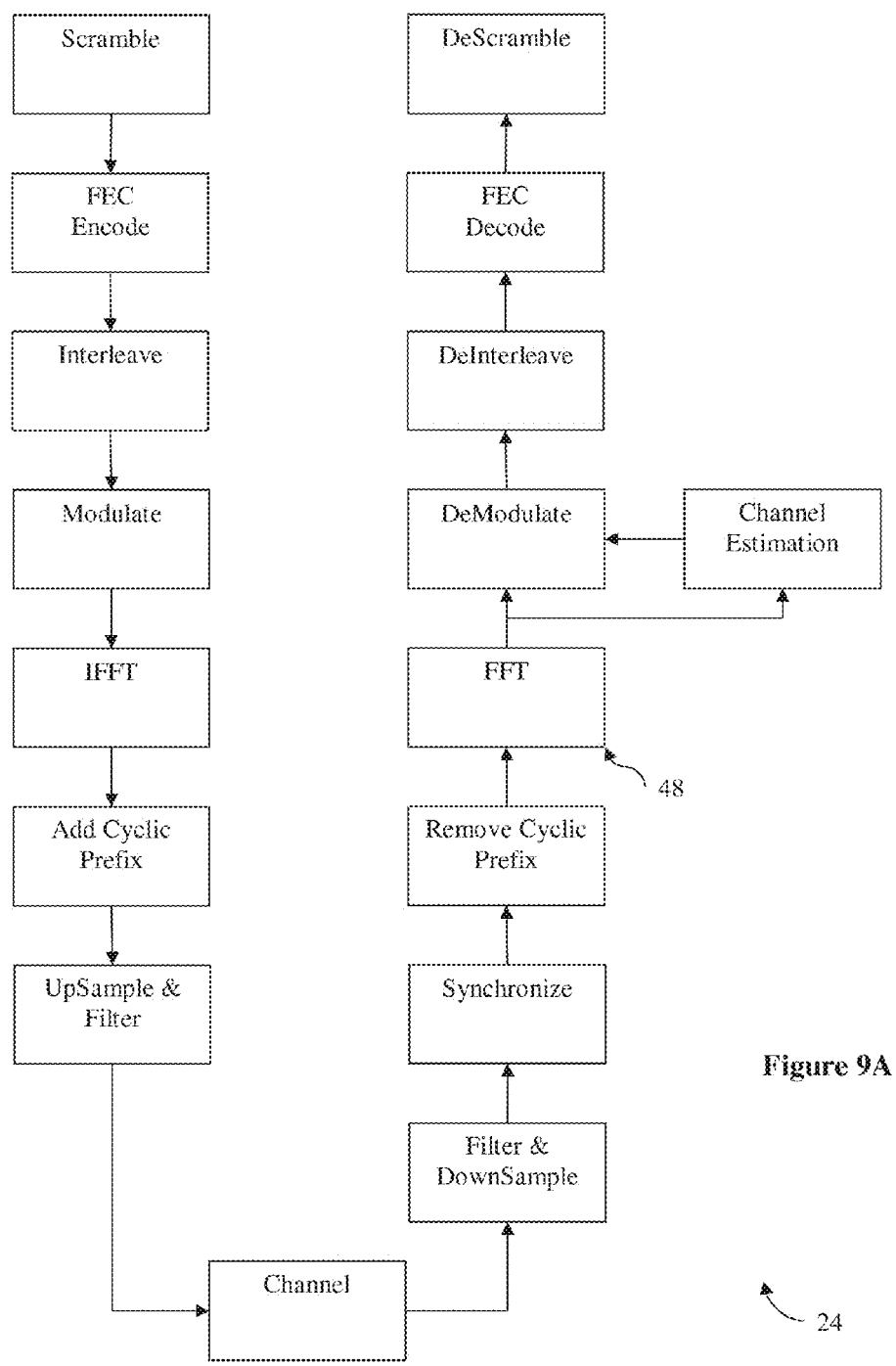
FIG. 9A: is a schematic diagram of a conventional IEEE 802.11a communications system.

A conventional IEEE 802.11a transmitter and receiver are illustrated in FIG. 9A. The transmitter implements a sequence of operations on the input data, ie scramble, FEC encode, interleave, modulate, IFFT, add cyclic prefix, upsample and filter. The resultant signal is transmitted over a transmission channel and a complementary receiver acts to filter and downsample the received signal, which is synchronized has the cyclic prefix removed and transformed to the frequency domain by an FFT. The output of the FFT is provided to a channel estimator and a demodulator, which uses the output of the channel estimator. The demodulated signal is deinterleaved, FEC decoded and descrambled.

These receivers are designed for multipath channels. Conventional IEEE 802.11a receivers are designed for indoor, low mobility channels characterised by low RMS delay spread (e.g. <200 ns) and low Doppler frequency (e.g. <300 Hz). When these receivers experience outdoor, high mobility channels they may fail. However, channel estimators and signal processors can be implemented that are able to cope with the high RMS delay spread and high Doppler frequency of outdoor, mobile channels.

If such a channel estimator and signal processor is incorporated into a Pre-Processor then the Pre-Processor may reduce the effect of the channel to the point where the existing IEEE 802.11a receiver can cope with it. Such a Pre-Processor allows conventional IEEE 802.11a ASIC receivers that have been designed for indoor, low mobility channels to be used on outdoor, highly mobile channels.

The exemplary embodiments described below are all IEEE 802.11a Pre-Processors. However, these techniques may also be applied to other communications systems. The described pre-processors are relevant to communications receivers that include a Radio Frequency (RF) circuit, a Medium Access Control (MAC) circuit and a Physical Layer (PHY) circuit. Protocols that include RP/PHY/MAC include IEEE 802.16 and IEEE 802.11. The described pre-processors may also be used in DVB-H and DVB-T contexts, which contain RF/PHY. Other relevant applications that may use the pre-processors, such as ADSL and Homeplug only contain PHY/MAC.

The pre-processors described herein may be implemented in hardware, for example application-specific integrated circuits (ASICs). Other hardware implementations include, but are not limited to, field-programmable gate arrays (FPGAs), structured ASICs, digital signal processors and discrete logic. Alternatively, the pre-processor may be implemented as software, such as one or more application programs executable within a computer system. The software may be stored in a computer-readable medium and be loaded into a computer system from the computer readable medium for execution by the computer system. A computer readable medium having a computer program recorded on it is a computer program product. Examples of such media include, but are not limited to CD-ROMs, hard disk drives, a ROM or integrated circuit. Program code may also be transmitted via computer-readable transmission media, for example a radio transmission channel or a networked connection to another computer or networked device.

Figure 9B:
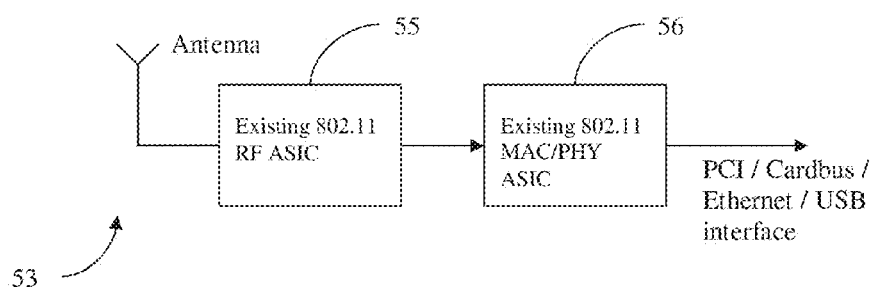
FIG. 9B: is a schematic diagram of a conventional IEEE 802.11a receiver implementation.
Figure 10:
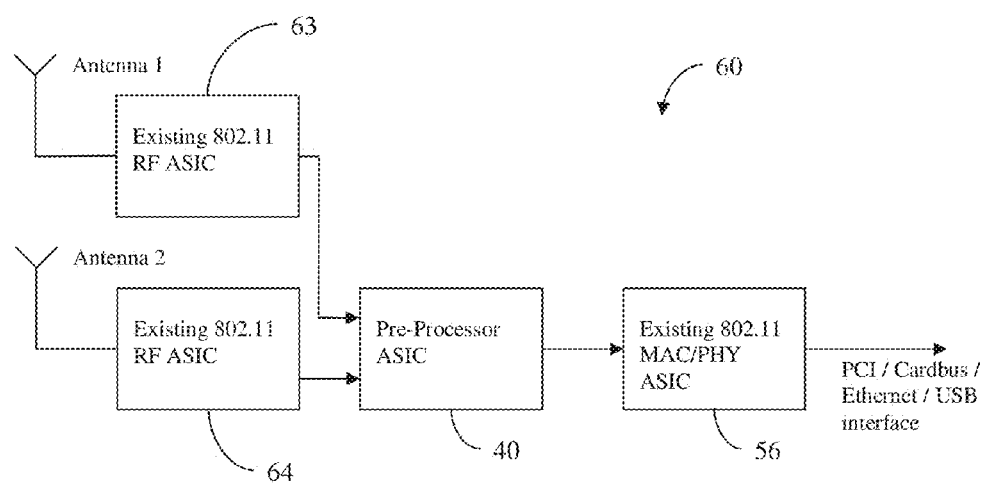
FIG. 10: is a schematic diagram of a Pre-Processor enabled IEEE 802.11a receiver implementation.

In one embodiment, the Pre-Processor 40 is designed to remove the effects of multipath and mobility from IEEE 802.11a channels and present the modified signal to an IEEE 802.11a receiver for subsequent demodulation and processing. A typical implementation of an IEEE 802.11 node 53 is shown in FIG. 9B. Here an off-the-shelf IEEE 802.11 RF ASIC 55 downconverts the signal received on the antenna 54 to baseband and passes this signal to an off-the-shelf IEEE 802.11 PHY/MAC ASIC 56, which processes the signal and outputs the data to the user via a number of possible interfaces. A model for an IEEE 802.11 node 60 incorporating an ASIC implementation of the Pre-Processor 40 is shown in FIG. 10 (other implementations are possible). Here two off-the-shelf IEEE 802.11 RF ASICs 63, 64 downconvert the signal received on two separate antennas 61, 62 to baseband and pass these signals to the Pre-Processor 40. The Pre-Processor 40 combines these two signals and removes some or all of the effect of the channel from the resultant signal before passing the processed signal to an off-the-shelf IEEE 802.11 PHY/MAC ASIC 56, which processes the signal as before and outputs it. The depicted embodiment of the Pre-Processor 40 uses signals from two antennas 61, 62, but it could also use one antenna or more than two antennas. Other embodiments may perform antenna selection as an alternative to signal combining.

Figure 11:
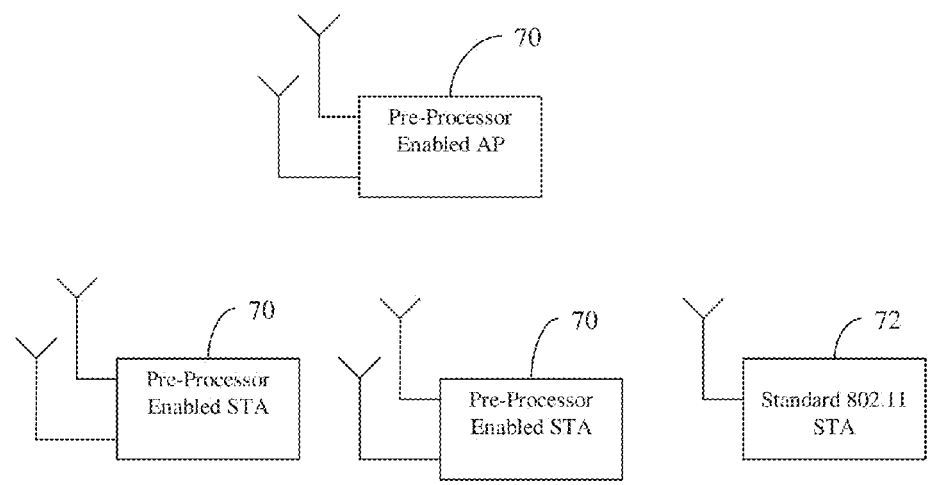
FIG. 11: is a schematic diagram of part of a communication network that includes Pre-Processor enabled IEEE 802.11a receivers and receivers without pre-processors.

A possible embodiment of a system of IEEE 802.11 nodes incorporating the Pre-Processor is shown in FIG. 11. This figure shows that Pre-Processor enabled nodes 70 can coexist in an IEEE 802.11 network with standard (i.e. non-Pre-Processor enabled) nodes 72.

In one arrangement the Pre-Processor uses analogue baseband inputs and outputs. However there are several other interface possibilities:

Digital baseband signals. This requires that the RF ASIC and/or the PHY/MAC ASIC have digital baseband interfaces, or external analogue-to-digital and digital-to-analogue converters are used.

Post-acquisition baseband signals. This would require that the PHY/MAC ASIC can have the PHY acquisition functionality bypassed.

Post MY demodulated signals. This would require that the PHY/MAC ASIC can have its PHY bypassed. It would also be possible to use a MAC only ASIC in this configuration.

PRY Bridge. In this configuration the Pre-Processor would incorporate a MAC and transmitter, and would retransmit data to the PHY/MAC ASIC.

RF input. In this configuration the functionality of the RF ASIC would be incorporated into the Pre-Processor ASIC.

RF Output. In this configuration the Pre-Processor ASIC receives a baseband signal from a standalone RF ASIC, and outputs an RF signal to an integrated RF/MAC/PHY ASIC.

RF input and RF output. This configuration would work with off-the-shelf IEEE 802.11 radios where the RF ASIC and MAC/PHY ASIC have been integrated. The Pre-Processor ASIC would receive signals at RF directly from the antenna(s), process them, and output them to the RF/MAC/PHY ASIC at RF. An important thing to do in this case is ensure that the RF inputs and RF outputs of the Pre-Processor ASIC do not interfere. This could be achieved by keeping the RF output power level very low, and/or by outputting the signal on a different channel to the channel used on the input.

The interfaces of the IEEE 802.11 Pre-Processor may be designed such that RF ASICs and PHY/MAC ASICs from several manufacturers are supported.

The Pre-Processor 40 may pass signals through without modification (except perhaps some delay) to the existing receiver 30. This bypass mode also allows the operation of the Pre-Processor enabled node 70 to be indistinguishable from a standard node (i.e. a non-Pre-Processor enabled node) 72.

Figure 12:
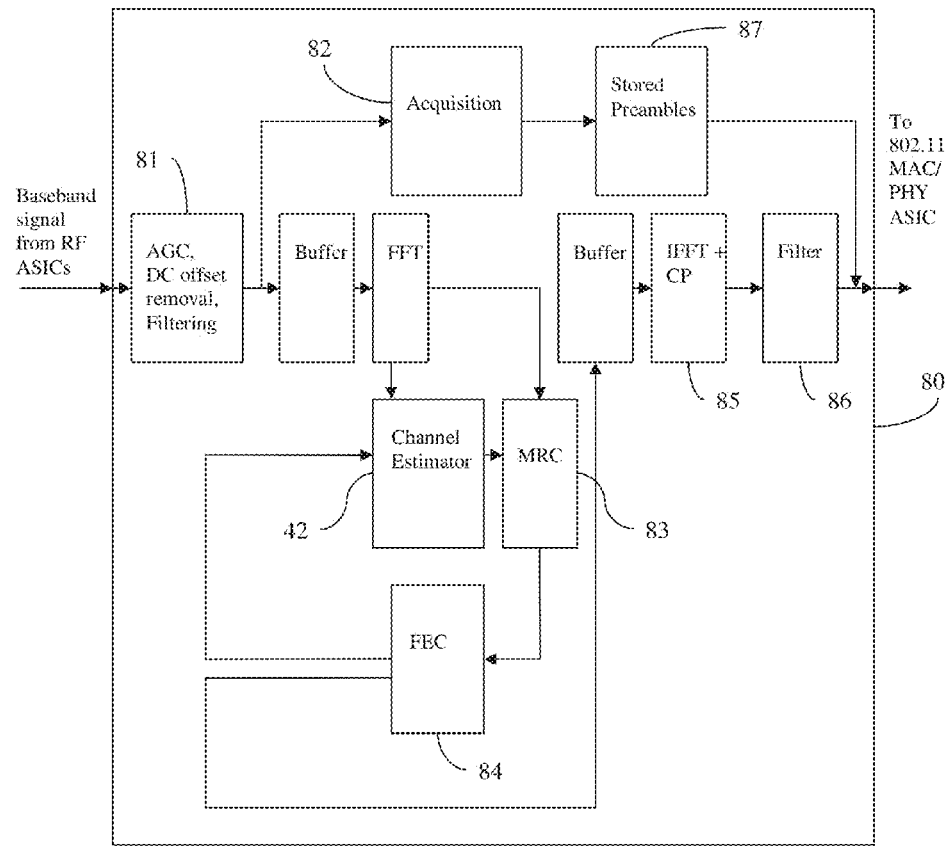
FIG. 12: shows a schematic block diagram of a first IEEE 802.11a Pre-Processor frequency domain embodiment.

FIG. 12 shows the preferred embodiment 80 of the IEEE 802.11a Pre-Processor. This embodiment uses algorithms derived from those defined in USA patent application publication US2004/0264561 "Filter structure for iterative signal processing" published on 30 Dec. 2004, Australian provisional patent application 2005904528 filed 22 Aug. 2005 and related PCT application PCT/AU2006/001201, PCT application PCT/A02007/000231 "Method and system for communication in a wireless network" filed 27 Feb. 2007 and PCT/AU2007/000722 "Method and apparatus for multicarrier communications" filed 24 May 2007, the contents of which are incorporated herein by cross-reference.

Pre-processor 80 takes the baseband signals from two RF ASICs (eg 63, 64) and performs automatic gain control (AGC), DC offset removal, and filtering in block 81. The filtered signal is output to the acquisition block 82, which identifies the beginning of the valid transmitted frame. If the frame is valid, it is converted from the time domain to the frequency domain using a fast Fourier transform (FFT) 48. The outputs from the FFT block 48 go to both the Channel Estimator block 42, and a linear combiner block 83, which in the depicted arrangement is a maximal ratio combiner (MRC) block. The maximal ratio combiner block 83 combines the outputs of the FFT block 48 and the channel estimator block 42. The outputs of the MRC block 83 are fed to the forward error correction (FEC) block 84. The outputs of the FEC block 84 are then used to direct the Channel Estimator 42. They are also passed to the Inverse FFT (IFFT) block 85 where they axe converted back into the time domain, and the cyclic prefix (CP) inserted. The output of block 85 is filtered in block 86 and output from the Pre-Processor 80.

The linear combiner block 83 may use a Minimum mean square error (MMSE) algorithm, or a zero forcing algorithm as an alternative to the maximal ratio algorithm.

Figure 13:
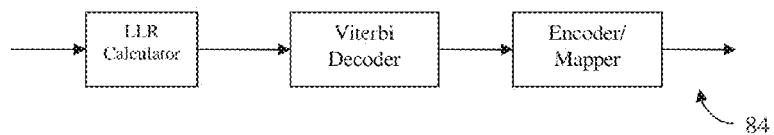
FIG. 13: shows a schematic diagram of a FEC block consisting of LLR calculator and Viterbi decoder for use in the pre-processor of FIG. 13.
Figure 14:
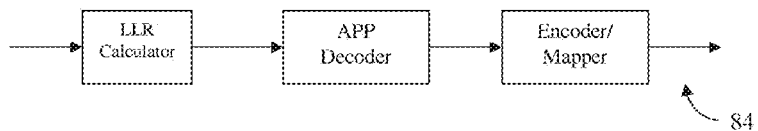
FIG. 14: shows a schematic diagram of a FEC block consisting of LLR calculator and APP decoder for use in the pre-processor of FIG. 13.

The FEC block 84 may use either a Viterbi decoder block, a re-encoder/mapper block, and an optional LLR calculator block (FIG. 13), or an a posteriori probability (APP) decoder block, a re-encoder/mapper block and optional LLR calculator (FIG. 14).

In another embodiment of the Pre-Processor 80 a second FEC decoder is used before re-encoding, as shown in PCT/AU2007/000722, which claims priority from Australian provisional patent application 2006902812. This introduces more latency, but increases decoding gain.

Figure 15:
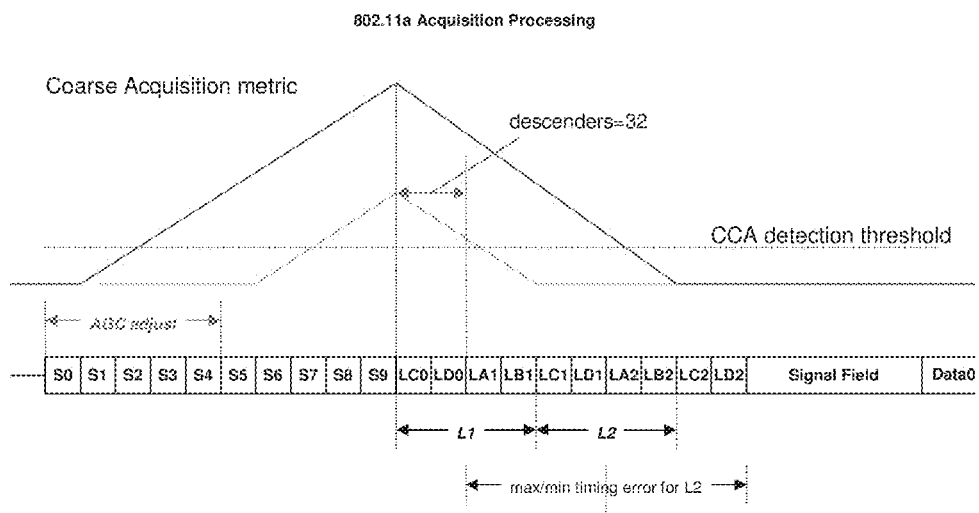
FIG. 15: illustrates IEEE 802.11a Pre-Processor acquisition processing.

The preferred embodiment of the IEEE 802.11a Pre-Processor 80 uses a method of initial acquisition that involves an autocorrelation of delay length equal to the short preamble word size (i.e. 16 samples at 20 MHz=0.8 µs). Another autocorrelation of delay length equal to 8 samples is then subtracted from this first autocorrelation to provide CW and DC offset rejection. The initial acquisition is detected by counting the number of descenders from a peak value (see FIG. 15). The peak value must be above a predefined threshold before the descender count is incremented. Once the number of descenders exceeds a threshold then acquisition is deemed to have occurred. If we assume there is minimal latency in the implementation and latency is due to constraints of receiving the samples only, then the latency for the short preamble initial acquisition decision is 32 samples @ 20 MHz into the Long Preamble. This delay is 1.6 µs after the start of the short preamble or 9.6 µs after the start of the Packet.

In the preferred embodiment of the IEEE 802.11a Pre-Processor 80 stored preambles are used to reduce latency. Here short and long preambles are stored in the data store 87 and are output once the Pre-Processor 80 has acquired the incoming packet. This means that the Pre-Processor 80 can start outputting the preamble with reduced delay.

In another embodiment of the IEEE 802.11 Pre-Processor 80 the preambles received from the channel are passed through to the output of the Pre-Processor.

In another embodiment of the IEEE 802.11a Pre-Processor the stored or passed through preambles are processed in order to ensure continuity in the channel that the MAC/PHY ASIC sees. Since the MAC/PHY ASIC 56 still performs its own channel estimate and removal on the signal, the ASIC 56 may be presented with a signal which it can demodulate without performance loss.

Figure 16:
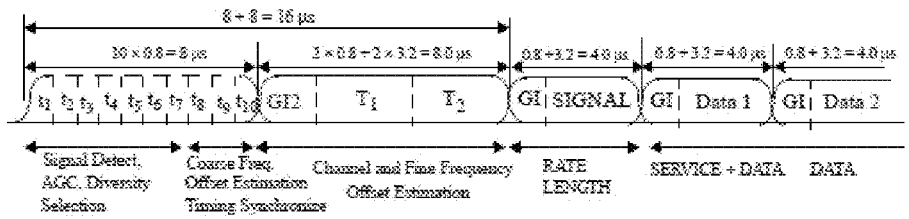
FIG. 16: illustrates the IEEE 802.11a preamble structure.

In the preferred embodiment of the IEEE 802.11a Pre-Processor 80 latency is reduced by only outputting a portion of the short preamble. In this arrangement the pre-processor 80 outputs a reduced number of short preamble sub-words, where the short preamble is constructed of 10 repetitions of the sub-word. The structure of the IEEE 802.11a preamble is shown in FIG. 16.

In another embodiment of the IEEE 802.11a Pre-Processor 80 the acquisition delay is reduced by beginning to output the short preamble to the MAC/PHY ASIC 56 immediately that a packet is detected. Then, once the timing has been determined from the long preamble the Pre-Processor 80 can stop transmitting the short preamble and start transmitting the stored long preamble. The transmission can commence in one of two ways. Firstly it can commence on the boundary of a short preamble sub-word. Secondly sub-word boundaries are ignored allowing the long preamble to begin transmission at the correct position as indicated by the timing of the received packet irrespective of the short preamble sub-word.

In another embodiment of the IEEE 802.11 Pre-Processor 80 the acquisition delay is reduced by continuously transmitting a stored short preamble to MAC/PHY ASIC 56 even when there is no packet present. Then, once the actual packet is detected the short preamble is stopped at an appropriate position and the long preamble and remainder of the packet transmitted to MAC/PHY.

Figure 17:
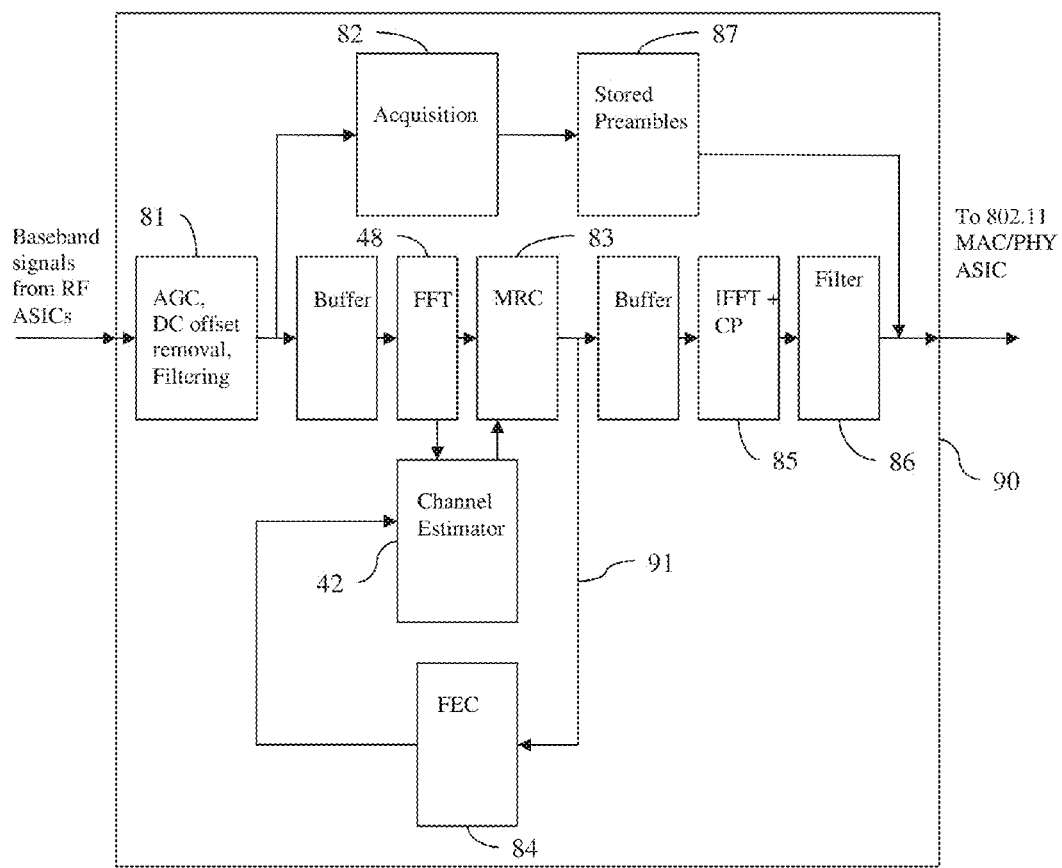
FIG. 17: is a schematic diagram of a second IEEE 802.11a Pre-Processor frequency domain embodiment with lower latency.

FIG. 17 shows an alternate embodiment 90 of an IEEE 802.11a Pre-Processor that has low latency. In this embodiment 90 the outputs 91 of maximum ratio combiner 83 are passed directly (or via a buffer) to the IFFT block 85, thereby reducing processing delay.

Figure 18:
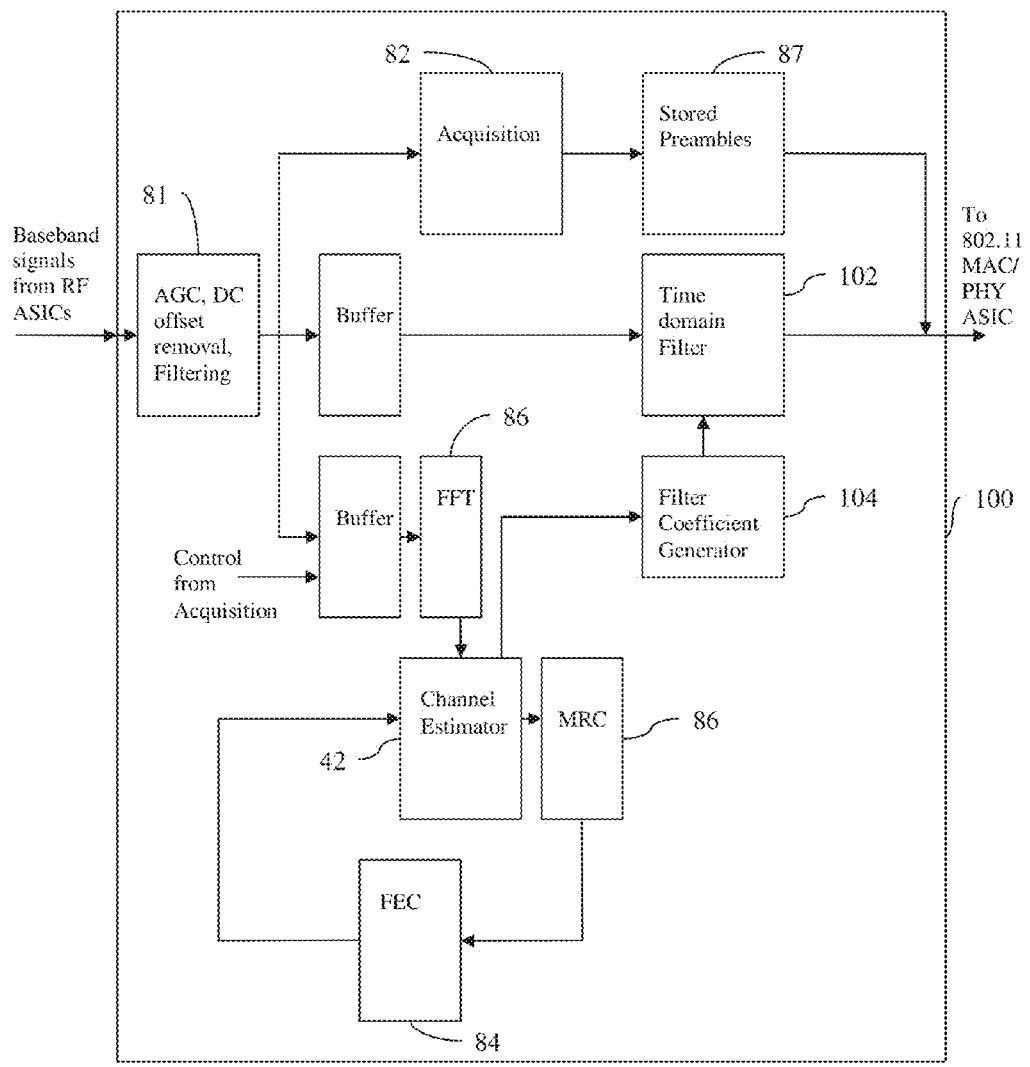
FIG. 18: is a schematic diagram of a third IEEE 802.11a Pre-Processor that uses time domain processing.

FIG. 18 shows an alternate embodiment 100 of an IEEE 802.11a Pre-Processor that has low latency. In this embodiment the effects of the channel are reduced or eliminated using a time domain filter 102. The coefficients of the time-domain filter 102 are generated by filter coefficient generator 104, which receives an output from the channel estimator 42. The output of the time domain, filter 102 is passed to the output of the pre-processor 100.

Figure 19:
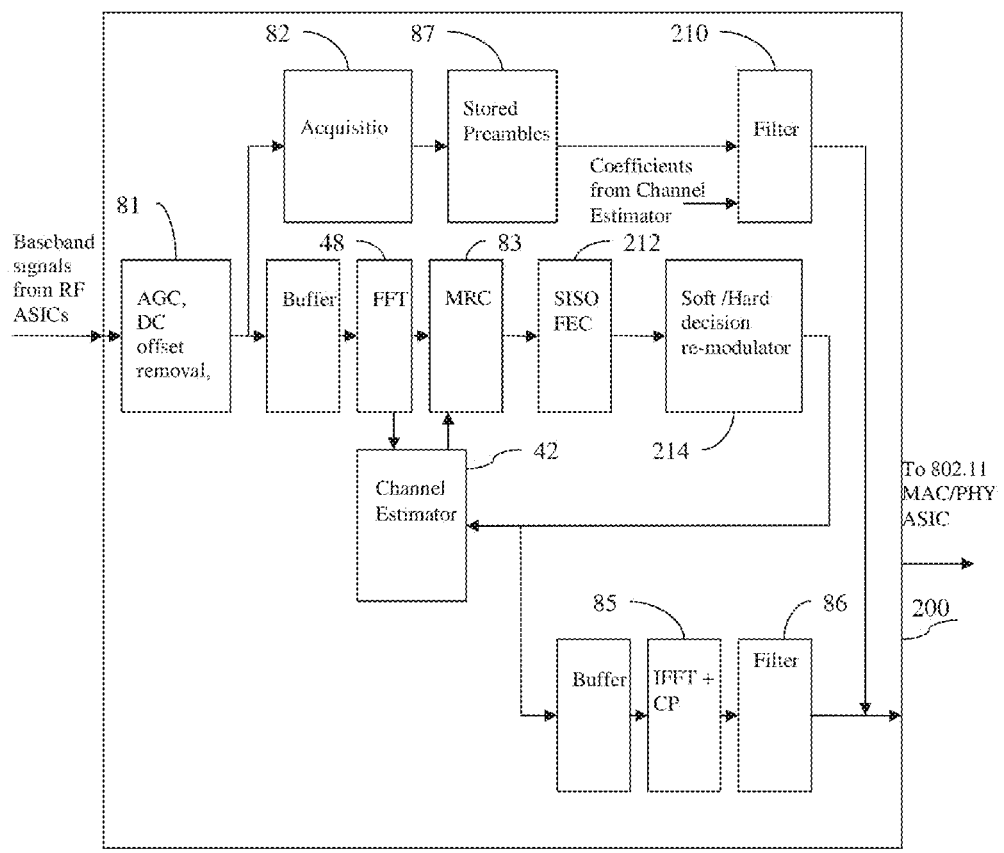
FIG. 19: is a schematic diagram of a further IEEE 802.11a Pre-Processor using frequency domain processing with hard or soft decision re-modulation.

FIG. 19 shows an alternate embodiment 200 of an IEEE 802.11a Pre-Processor structure which performs either soft or hard re-modulation and processing in the frequency domain before retransmitting the data. This structure uses a soft-input soft-output (SISO) FEC block 212 that receives an output from the NRC block 83. The decoder in the SISO FEC block could be any SISO decoder, such as a soft-output Viterbi algorithm (SOVA) or APP decoder. The output of the SISO FEC 212 is processed by the soft/hard decision re-modulator 214, which in turn directs the channel estimator 42. The output of the re-modulator 214 is also passed to the IFFT block 85. The preambles are processed by filter 210, coefficients for which are provided by the channel estimator 42.

The IEEE 802.11a standard specifies that acknowledgement (ACK) frames commence transmission within one short interframe space (SIFS) of the end of the corresponding data frame being received. The SIPS time is defined to be 16 µs. The IEEE 802.11j modification of the IEEE 802.11a standard introduced Coverage Classes, which are a mechanism to compensate for air propagation time of signal. In the described embodiments of the IEEE 802.11a Pre-Processor, if there exists any delay in excess of the SIFS time, such a delay is compensated for by increasing the Coverage Class by an amount at least equal to the delay.

Several IEEE 802.11 MAC/PHY ASICs 56 have a programmable SIFS time, and can have their SIFS time reduced to a value less than 16 µs. In the described embodiments of the IEEE 802.11a Pre-Processor if there exists any delay in excess of the SIFS time of the Pre-Processor ASIC and MAC/PHY ASIC combination, then such a delay or part thereof, is compensated by reducing the programmable SIFS time of the MAC/PHY ASIC 56.

The IEEE 802.11a standard specifies that ACK frames are transmitted within SIFS (16 µs) of the end of the previous frame. However, no other transmitters under control of a distributed control function (DCF) will transmit on the channel until DCF interframe space (DIFS, 34 µs) after the previous frame. This is to allow transmitters under control of a point control function (PCF) to transmit PCF interframe space (PIFS, 25 µs) after the previous frame. However, if PCF is not used in the network then, in the IEEE 802.11a Pre-Processor, if there exists any delay in excess of the SIFS time, such a delay or part thereof can be tolerated by waiting PIFS time for the ACK frames.

The IEEE 802.11a standard supports several PHY data rates (6, 9, 12, 18, 24, 36, 48, and 54 Mbps). In the embodiment of the IEEE 802.11a Pre-Processor shown in FIG. 12 it is not necessary that the re-encoding and re-mapping of output signal is at the same data rate as the input signal. Some of the delay in excess of the SIFS time may be compensated by outputting the delayed output signal at a higher data rate in such a way as to ensure that the end of the frame at the output of the Pre-Processor is as close as possible to the end of the frame at the input to the Pre-Processor.

In order for the slot timing mechanism in the IEEE 802.11a standard to work correctly, the receiver must be able to detect the presence of another 802.11a signal within the clear channel assessment (CCA) time (CCA_time). For IEEE 802.11a the detection time is 4 µs. IEEE 802.11 MAC/PHY ASICs typically use a received signal strength indicator (RSSI) from an IEEE 802.11 RF ASIC to perform CCA. One embodiment of the IEEE 802.11a Pre-Processor forces the CCA_busy state in the MAC/PHY ASIC 56 by setting this RSSI input to a level above the CCA_power_threshold (the standard requires that any signal greater than −62 dBm should generate a CCA_busy state). This means that the CCA circuit of the MAC/PHY ASIC 56 is not affected by the delay of the Pre-Processor.

In the preferred embodiment of the IEEE 802.11a Pre-Processor the status and control signals (such as the RSSI signal) from the IEEE 802.11 RF ASIC (eg 63, 64) are input to the Pre-Processor ASIC 40, delayed such that they are aligned to the output signal of the pre-processor 40, and output to the IEEE 802.11a MAC/PHY ASIC 56.

The pre-processor arrangements described herein provide:

A method of using a Pre-Processor placed prior to a communications receiver in order to improve the performance of the receiver;

A method of using a Pre-Processor placed prior to a communications receiver in order to improve the performance of the receiver by changing the channel that the receiver observes;

A method of using a Pre-Processor placed prior to a communications receiver in order to expand the range of channels that the receiver can operate with;

A method of using a Pre Processor in conjunction with an existing communications receiver in order to improve the performance of the receiver and to expand the range of channels that the receiver can operate with;

A method of using a Pre-Processor in conjunction with an IEEE 802.11 communications receiver in order to improve the performance of the receiver and to expand the range of channels that the receiver can operate with;

A Pre-Processor that operates in the time domain;

A Pre-Processor that operates in the time domain and uses a time-domain filter to combine the channel estimate with the received signal A Pre-Processor that operates in the frequency domain;

A Pre-Processor that operates in the frequency domain and uses an FFT and an IFFT to perform the time domain to frequency domain transformation, and frequency domain to time domain transformation, respectively;

A Pre-Processor that operates in the frequency domain and uses a MRC to combine the channel estimate with the received signal;

A Pre-Processor that operates in the frequency domain and drives the channel estimator with output of the MRC;

A Pre-Processor that operates in the frequency domain and drives the channel estimator with the demodulated, and remodulated output of the MRC;

A Pre-Processor that operates in the frequency domain and drives the channel estimator with the demodulated, FEC decoded, FEC re-encoded, and remodulated output of the MRC;

A Pre-Processor that has inputs from one or more antennas;

A Pre-Processor that allows Pre-Processor enabled receivers to coexist in a network with non-Pre-Processor enabled receivers;

A Pre-Processor that can be placed between the antenna and an existing IEEE 802.11 RF/PHY/MAC receiver circuit;

A Pre-Processor that incorporates an IEEE 802.11 RF circuit and can be placed between the antenna and an existing IEEE 802.11 PHY/MAC receiver circuit;

A Pre-Processor that can be placed between one or more existing IEEE 802.11 RF circuit and an existing IEEE 802.11 RF/PHY/MAC receiver circuit;

A Pre-Processor that can be placed between an existing IEEE 802.11 RF circuit and an existing IEEE 802.11 PHY/MAC receiver circuit;

A Pre-Processor that can be placed between an existing IEEE 802.11 RF circuit and an existing IEEE 802.11 PHY/MAC receiver circuit, that bypasses the acquisition circuit of the existing PHY circuit;

A Pre-Processor that can be placed between an existing IEEE 802.11 RF circuit and an existing IEEE 802.11 PHY/MAC receiver circuit, that bypasses the existing PHY circuit;

A Pre-Processor that can be placed between an existing IEEE 802.11 RF circuit and an existing IEEE 802.11 PHY/MAC receiver circuit, that acts as a bridge;

A Pre-Processor that supports the interfaces of more than one manufacturer of IEEE 802.11 radio components;

A Pre-Processor that has a bypass mode that passes input signals through to the output with little or no modification;

A Pre-Processor that outputs a signal derived from a hard decision output of an FEC decoder circuit;

A Pre-Processor that outputs a signal derived from a soft decision output of an MRC circuit;

A Pre-Processor that outputs a signal derived from a time domain filter circuit;

A Pre-Processor that uses a Viterbi decoder;

A Pre-Processor that uses a SOVA decoder;

A Pre-Processor that uses an APP decoder;

A Pre-Processor that incorporates more than one FEC block;

A Pre-Processor that uses an acquisition circuit that utilises two autocorrelations of different lengths;

A Pre-Processor that uses stored preambles that are output;

A Pre-Processor that passes preambles through to the output;

A Pre-Processor that processes stared or passed through preambles;

A Pre-Processor that deletes part of the preamble;

A Pre-Processor that outputs the short preamble immediately that a signal is detected in the input, and then outputs the long preamble once timing is acquired;

A Pre-Processor that outputs the short preamble continuously, and then outputs the long preamble once timing is acquired;

A method of compensating for delay in a Pre-Processor enabled node in an IEEE 802.11 network by increasing the Coverage Class;

A method of compensating for delay in a Pre-Processor enabled node in an IEEE 802.11 network by decreasing SIFS time of the IEEE 802.11 MAC/PHY ASIC;

A method of compensating for delay in a Pre-Processor enabled node in an IEEE 802.11 network by increasing SIPS time to PIFS time;

A method of compensating for delay in a Pre-Processor enabled node in an IEEE 802.11 network by outputting signals at a higher data rate from the Pre-Processor than that received from the channel;

A method of compensating for delay in a Pre-Processor enabled node in an IEEE 802.11 network by asserting the CCA signal of the IEEE 802.11 MAC/PHY circuit early; and A Pre-Processor that processes the status and control signals input from the IEEE 802.11 RF circuits before outputting them to the IEEE 802.11 MAC/PHY circuit.

Prediction and Removal of ICI

The receiver performance may be improved by predicting and removing Inter-Carrier Interference (ICI), as described below.

In the frequency domain a channel for Orthogonal Frequency Division Multiplexing (OFDM) affected by ICI may be modelled using a matrix model where an interference matrix models the transform of the transmitted symbols to an equivalent set of received symbols. When the matrix has non-zero off-diagonals, ICI results. In most circumstances the dominant interfering terms are the principal off-diagonals describing interference from adjacent subcarriers. When we consider only interference from the adjacent subcarriers the resulting vector model of the received OFDM symbol r[i] is:

$$r[i]=h_{-1}[i] \cdot d_{-1}[i]+h_0[i] \cdot d[i]+h_{+1}[i] \cdot d_{+1}[i]$$

where $h_0[i]$ is a vector from the channel interference matrix that characterises the direct effect of the channel on the component of the received symbol containing the desired symbol;

$h_{-1}[i]$ is a vector from the channel interference matrix that characterises the interference caused by the subcarrier with index one less than the subcarrier of interest (the subcarriers are indexed in incremental order across the band);

$h_{+1}[i]$ is a vector from the channel interference matrix that characterises the interference caused by the subcarrier with index one more than the subcarrier of interest;

d[i] is a vector of transmitted frequency domain symbols for OFDM symbol i;

$d_{-1}[i]$ is derived from d[i] by moving values to new locations having index one less than their original positions (The treatment of the subcarrier with lowest index is arbitrary);

$d_{+1}[i]$ is a cyclic rotation of d[i] moving values to new locations having index one more than there original positions (The treatment of the subcarrier with highest index is arbitrary); and The operator · represents element-wise multiplication of equal-sized vectors.

Note that although $d_{-1}[i]$, $d_{+1}[i]$ and d[i] are all shifted versions of each other the same is not true of the vectors $h_{-1}[i]$, $h_{+1}[i]$ and $h_0[i]$. Estimates of these parameters at the receiver are identified using a caret (^) or explicitly stated as an estimate.

Estimates of $h_0[i]$ may be referred to herein as direct channel estimates. Estimates of $h_{-1}[i]$ and $h_{+1}[i]$ may be referred to as intercarrier interference channel estimates.

The system and method for ICI removal are described with reference to three modular building blocks, designated module A, module B and module C respectively. The modules may be implemented in hardware, for example application-specific integrated circuits (ASICs). Other hardware implementations include, but are not limited to, field-programmable gate arrays (FPGAs), structured ASICs, digital signal processors and discrete logic. Alternatively, the modules may be implemented as software, such as one or more application programs executable within a receiver system. The software may be stored in a computer-readable medium and be loaded into a receiver system from the computer readable medium for execution by the receiver system. A computer readable medium having a computer program recorded on it is a computer program product. Examples of such media include, but are not limited to CD-ROMs, hard disk drives, a ROM or integrated circuit. Program code may also be transmitted via computer-readable transmission media, for example a radio transmission channel or a networked connection to another computer or networked device.

The ICI removal may be carried out in a receiver unit or in a pre-processor associated with a receiver unit.

Figure 20:
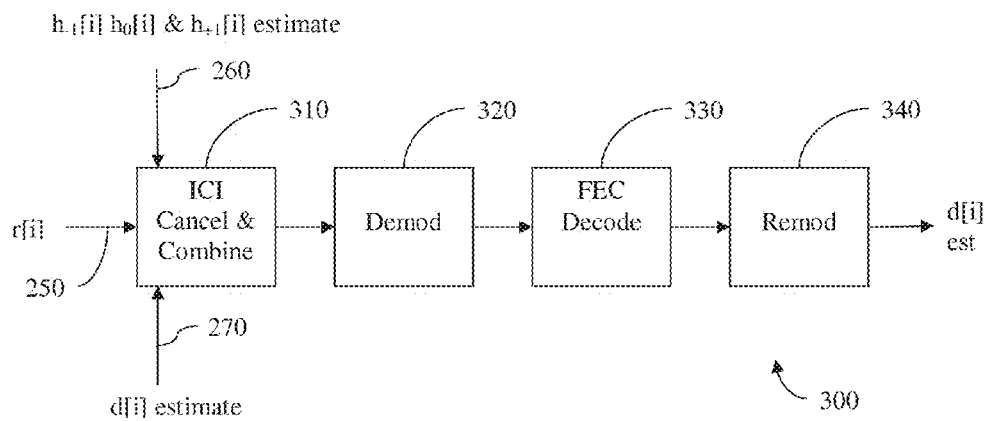
FIG. 20: shows a schematic diagram of a FEC constraint module that may be used in the prediction and removal of Inter-Carrier Interference (ICI) effects.

FIG. 20 shows a functional block diagram of a module 300 (designated Module A) that operates to apply FEC constraints. The inputs to the FEC module 300 are a transmitted symbol estimate $\hat{d}[i]$ 270, a set of channel estimates $\hat{h}_0[i]$, $\hat{h}_{-1}[i]$ and $\hat{h}_{+1}[i]$ 260 and the received signal r[i]. The output of FEC module 300 is an information bit sequence and (optionally) transmitted symbol estimates. The FEC module 300 includes a functional block 310 (the ICI Cancel and Combine block). In block 310 the symbol estimate used for demodulation is derived by first cancelling the interference from adjacent subcarriers and then combining the ICI free energy pertaining to the symbol of interest as follows:

$$r_c[i] = \text{shift}\left(\hat{h}_{-1}^*[i] \cdot \left(r[i] - \hat{h}_0[i]\hat{d}_0[i] - \hat{h}_{+1}[i]\hat{d}_{+1}[i]\right), 1\right) + \quad \text{(Eq. 1)}$$
$$\hat{h}_0^*[i] \cdot \left(r[i] - \hat{h}_{-1}[i]\hat{d}_{-1}[i] - \hat{h}_{+1}[i]\hat{d}_{+1}[i]\right) +$$
$$\text{shift}\left(\hat{h}_{+1}^*[i] \cdot \left(r[i] - \hat{h}_0[i]\hat{d}_0[i] - \hat{h}_{-1}[i]\hat{d}_{-1}[i]\right), -1\right).$$

The shift(x, m) function executes the cyclic rotation of the vector by m steps described above. * indicates a conjugate transpose. Cyclic rotation maps entries in position i to position j where j=i−m. If j is negative or greater than the maximum index of the input vector then no action is taken. Values that are not written to are set to zero.

Here we have used a Maximum Ratio Combiner approach through the use of $\hat{h}^*[i]$ in Eq 1. Other weightings may be used such as those derived according to an MMSE criteria.

The channel against which the new composite symbol is demodulated is calculated as:

$$h_c[i]=h_{-1}^*[i] \cdot h_{-1}[i]+h_0^*[i] \cdot h_0[i]+h_{+1}^*[i] \cdot h_{+1}[i]$$

Figure 25:
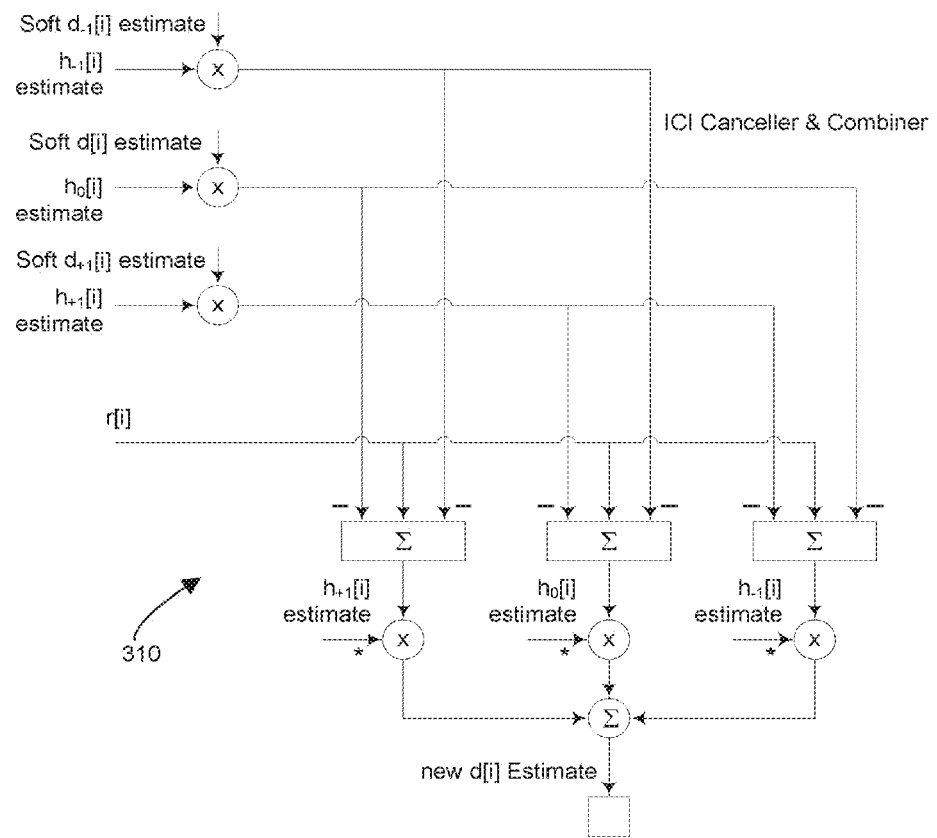
FIG. 25: shows a schematic diagram of an ICI Canceller and Combiner block used in the FEC module of FIG. 21.

Optionally, the first and third lines of Eq. 1 may be dropped to save complexity, leaving the observation $r_c[i]=h_0^*[i] \cdot (r[i] - \hat{h}_{-1}[i]\hat{d}_{-1}[i]-\hat{h}_{+1}[i]\hat{d}_{+1}[i])$ and composite channel $h_c[i]=h_{-1}^*[i-1] \cdot h_{-1}[i]$ The ICI canceller and combiner processing element 310 for a given OFDM symbol i is shown in FIG. 25.

The output of the ICI Cancel and Combine block 310 is provided to Demodulation module 320. The FEC Decoding 330 uses the output of demodulator 320 to generate information bit estimates. If the FEC decoding 330 employs soft output methods (e.g. A-Posteriori Probability (APP) decoding using the forward backward algorithm) then hard and soft transmitted symbol estimates may be generated using hard and soft remodulators 340. If hard decision decoding (such as Viterbi decoding) was used in the FEC decoder 330 then hard remodulation may be applied in block 340 to generate a hard estimate of the transmitted symbol. In any case pilot symbols (known a priori) should be inserted in the estimate.

It is also possible to ignore the FEC constraints and apply a "slicer" to the received symbols r[i] to generate an estimate of the transmitted symbols d[i]. The slicer may produce hard or soft decisions. Hard decisions from a "slice" can be generated by computing the constellation point with minimum distance to the received point given the channel model. Soft decisions from a "slicer" can be generated by computing the likelihood for each constellation point given the channel model and then computing the average symbol.

Figure 21:
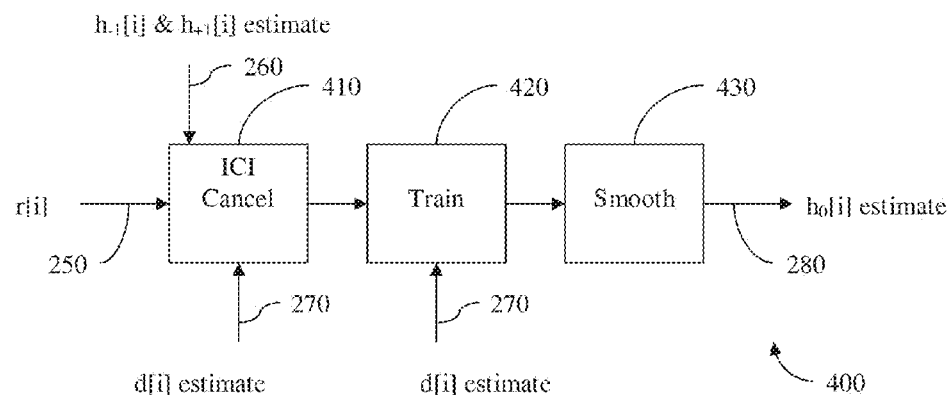
FIG. 21: shows a schematic diagram of a module that may be used to estimate the Direct Component of a Channel Estimate.

FIG. 21 shows a functional block diagram of a Direct Channel Estimator 400 (designated Module B). Given a received symbol r[i], a transmitted symbol estimate $\hat{d}[i]$ 270 and the ICI channel estimates $\hat{h}_{-1}[i]$ and $\hat{h}_{+1}[i]$ 260, the direct channel estimate $\hat{h}_0[i]$ may be derived as follows:

$$\hat{h}_0[i]=\text{smooth}(\text{inv}(\hat{d}[i])\cdot(r[i]-\hat{h}_{-1}[i]\hat{d}_{-1}[i]-\hat{h}_{+1}[i]\hat{d}_{+1}[i]))$$ Eq. 2

Figure 22:
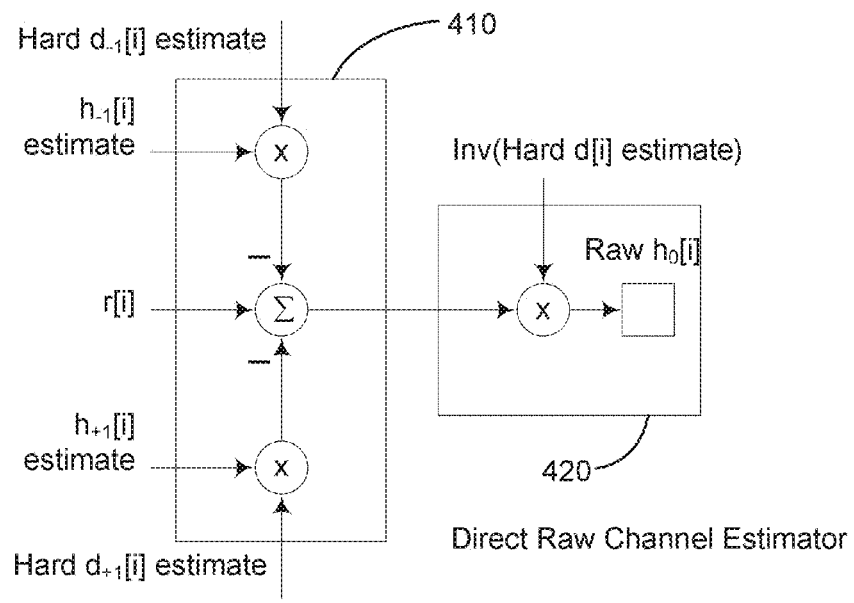
FIG. 22: shows further detail of the ICI Cancelling and Training aspects of the Direct Channel Estimator of FIG. 21.

An ICI cancel block 410 subtracts the ICI estimates from the received signal r[i], as illustrated in FIG. 22. The training block 420 generates the element-by-element multiplication with the inverse of the hard estimate, inv(d[i]), and the output of the training block 420 is smoothed by the smoothing block 430 to produce an estimate 280 of the direct component channel, $h_0[i]$. Various smoothing techniques may be used, including convolution by a low-pass filter. Another smoothing option is to transform the estimates using an FFT, window the transform and then apply an IFFT.

Equation 2 reflects the combined operation of blocks 410, 420 and 430. The direct channel estimator processing element 400 for a given OFDM symbol i is shown in more detail in FIG. 22 excluding the smoothing function 430.

Figure 23:
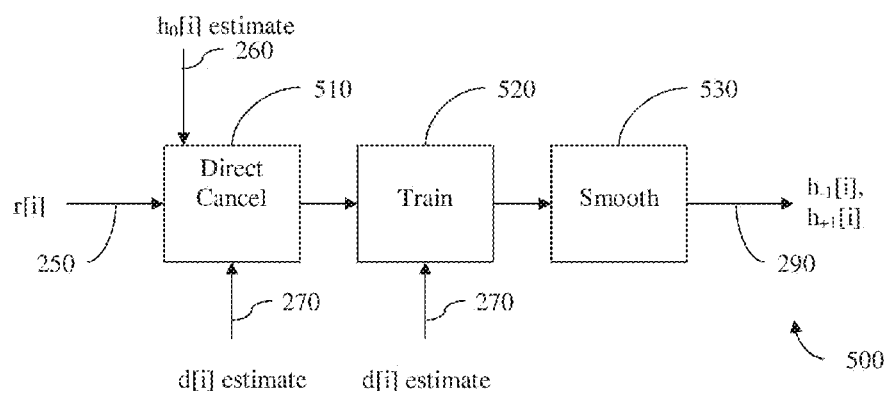
FIG. 23: shows a schematic diagram of a module that estimates an ICI Component of the Channel Estimate.

FIG. 23 shows a functional block diagram of an ICI Channel Estimator 500 (designated module C). The inputs to the ICI Channel Estimator 500 are the received symbol r[i] 250, a transmitted symbol estimate $\hat{d}[i]$ 270 and a direct channel estimate $\hat{h}_0[i]$ 260. The ICI channel estimator 500 generates estimates 290 of $\hat{h}_{-1}[i]$ and $\hat{h}_{+1}[i]$ as follows $$\hat{h}_{-1}[i]=\text{smooth}(\text{inv}(\hat{d}_{-1}[i])\cdot(r[i]-\hat{h}_0[i]\hat{d}_0[i]-\hat{h}_{+1}[i]\hat{d}_{+1}[i]))$$ Eq. 3a $$\hat{h}_{+1}[i]=\text{smooth}(\text{inv}(\hat{d}_{+1}[i])\cdot(r[i]-\hat{h}_0[i]\hat{d}_0[i]-\hat{h}_{-1}[i]\hat{d}_{-1}[i]))$$ Eq. 3b Eqs. 3a and 3b reflect the overall operation of functional blocks 510, 520 and 530 of the ICI Channel Estimator 500. The 'Direct Cancel' block 510 implements the expression within round brackets that subtracts the contribution of the direct channel and one of the ICI terms from the received symbol r[i]. The training block 520 implements the element-by-element multiplication of the respective outputs of block 510 with an inverse of the symbol estimates $\hat{d}_{-1}[i]$ or $\hat{d}_{+1}[i]$. The raw outputs of block 520 (ie estimates of $h_{-1}[i]$ and $h_{+1}[i]$) are smoothed in smoothing block 520. The smooth function may be implemented in the time or frequency domain. The bandwidth of the smoothing may be set according to the coherence frequency of the radio channel.

The inv function computes (or obtains via a lookup table) the inverse of the symbols. For example, if the transmitted symbol on a subcarrier was (1+j)/sqrt(10) then the inverse (that forces the product to unity) is sqrt(5/2)(1−j).

Figure 24:
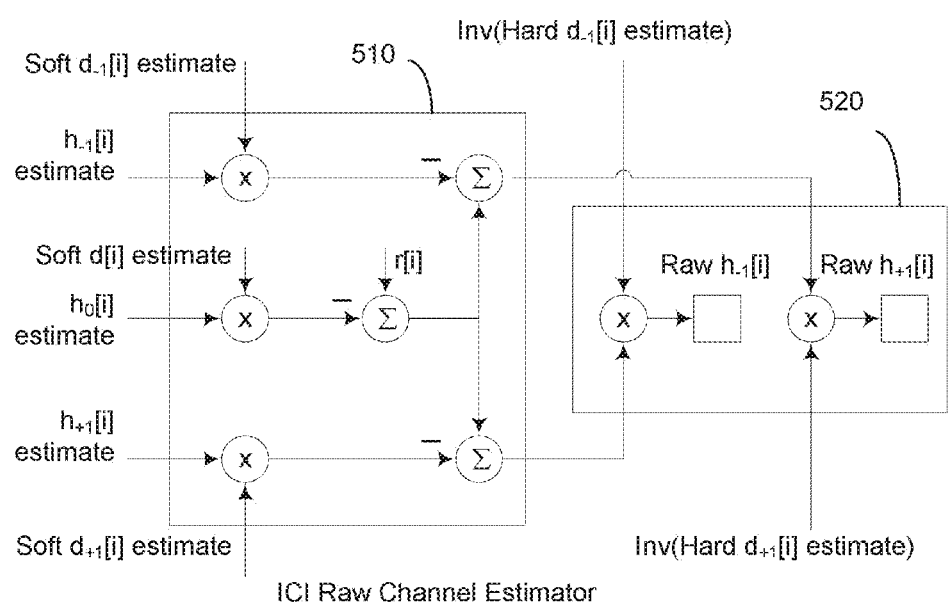
FIG. 24: shows detail of the ICI Cancelling and Training aspects of the ICI Channel Estimator of FIG. 23.

The ICI channel estimator processing element 500 for a given OFDM symbol i is shown in FIG. 24, excluding the smoothing function 530. In the depicted arrangement soft estimates of the transmitted symbols are used as inputs to block 510, and hard estimates are used for the training block 520.

Figure 26:
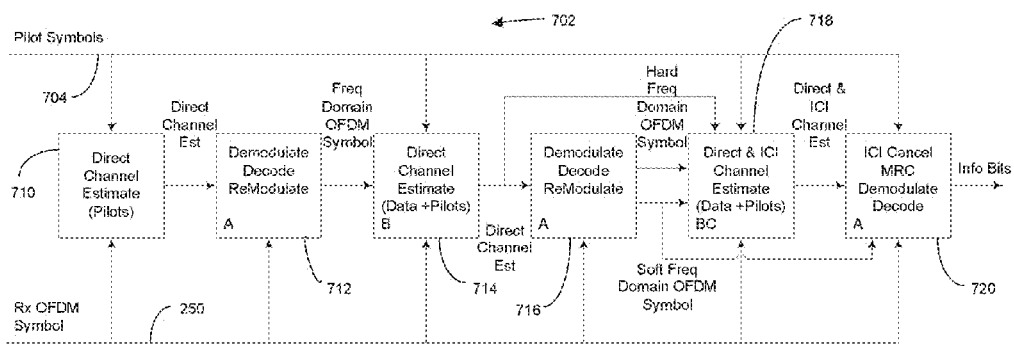
FIG. 26: illustrates a schedule for prediction and removal of ICI using the modules of FIGS. 21-26 and based on Soft Remodulation.

FIG. 26 is a schematic representation of a schedule 702 for decoding a received OFDM symbol 250. It is assumed that the OFDM symbol 250 is subject to convolutional coding, interleaving and modulation at the transmitter. The schedule 702 may be implemented at the receiver using the modules A, B and C described above.

All estimate memories are initialised to zero, including the Direct Channel Estimate, transmitted symbol estimate and ICI channel estimate. Inputs to the schedule 702 include a received OFDM symbol 250 and pilot symbols 704.

In a first stage 710 of the schedule 702, the receiver obtains a first Direct channel estimate using the received output r[i] 250, and the pilot symbols 704. The output r[i] may be a frequency-domain version output from a FFT (not shown).

The initial estimate of the direct channel may be obtained in stage 710 by first removing the effect of the Transmitted pilots 704 on the corresponding subcarriers in the received OFDM symbol 250. This is typically done, for Phase Shift Keyed (PSK) modulation, via multiplication with the conjugate of the transmitted pilot. This may be implemented using the training block 420. The resulting raw estimate of the direct channel may then be smoothed, for example using block 430 to obtain a channel estimate for the data bearing subcarriers. Options for obtaining the channel estimate include:

a) Replicating the channel estimate of the pilot subcarrier on the surrounding subcarriers until the next pilot subcarrier is closer.
 b) Constructing a frequency domain estimate of the channel by copying the pilot-based channel estimates to a vector of length equal to the number of subcarriers and setting the data positions to zero. The resulting vector is transformed through use of an IFFT. The low frequency terms in the transposed domain are then selected through application of a window. The windowed vector is then transformed back to the frequency domain.
 c) A further option is to perform process a) and then process b).
 d) Another option is to perform process a) and then apply a bidirectional auto regression (as described, for example, in co-pending PCT application PCT/AU2006/001201 (publication number WO 2007/022564) claiming priority from Australian application AU2005904528, the contents of which are incorporated herein by cross-reference).

Then stage 712 of the schedule 702 demodulates and decodes the OFDM symbol 250 using the first Direct Channel Estimate output from stage 710. The output of stage 712 is a first transmitted symbol estimate (including pilot insertion). Stage 712 may be implemented using Module A 300.

The next stage 714 of schedule 702 uses the first Direct Channel estimate 260 output from stage 710 and the first transmitted symbol estimate 270 output from stage 712 to generate a second estimate 280 of the Direct Channel. The stage 714 may be implemented using Module B 400.

The direct channel estimate output from stage 714 is used as an input to the next stage 716 and also to the subsequent stage 718. Stage 716 uses Module A 300 to demodulate and decode the OFDM symbol 250 using the second Direct Channel Estimate 280 to obtain a second transmitted symbol estimate (including pilot insertion). Stage 716 may output both a hard frequency domain estimate and a soft frequency domain estimate of the transmitted symbol.

The next stage 718 of schedule 702 may be implemented using Module B 400 and Module C 500. Inputs to stage 718 include the second direct channel estimate from stage 714 and the second transmitted symbol estimate from stage 716. In stage 718 the second Direct Channel estimate 280 and the second transmitted symbol estimate 270 are provided to Module B 400 to generate a third estimate of the Direct Channel 280.

In stage 718 the third Direct Channel estimate 280 and the second transmitted symbol estimate 270 are provided to Module C 500 to generate a first ICI channel estimate 290.

Stage 720 uses module A 300 without the retransmission stage 340 to demodulate and decode the OFDM symbol 250 using the third Direct Channel Estimate 280 and the first ICI channel estimate 290 to obtain a final information bit estimate. Stage 720 uses the soft frequency domain symbol estimate output in stage 716.

Figure 27:
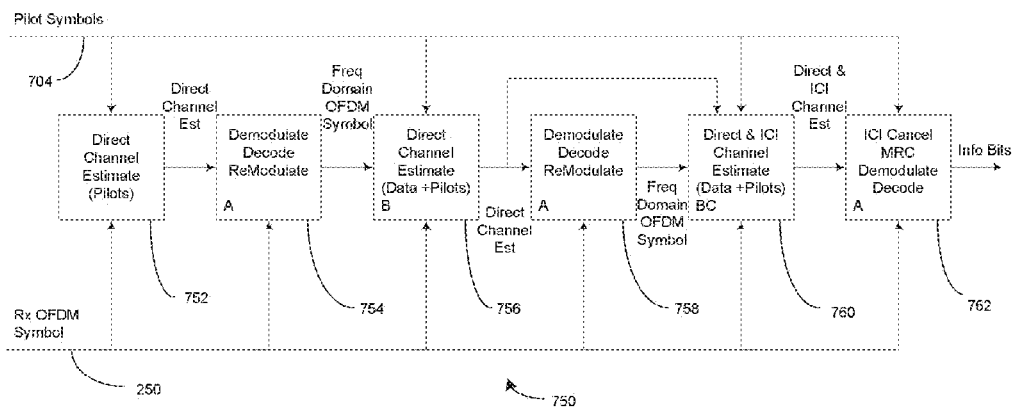
FIG. 27: illustrates a schedule for prediction and removal of ICI using the modules of FIGS. 21-26 and based on Hard Remodulation.

FIG. 26 shows the schedule 702, which uses soft decisions. FIG. 27 is a schematic illustration of a schedule 750 that is similar to schedule 702 but does not use soft decisions. Inputs include pilot symbols 704 and the received OFDM symbol 250. Stage 752 provides an initial estimate of the direct channel based on the pilot symbols. Stage 754 then provides a first estimate of the transmitted OFDM symbol. Stage 756 then provides an updated estimate of the direct channel and stage 758 provides a second estimate of the frequency domain OFDM symbol. Stage 760 provides a further estimate of the direct channel and provides an estimate of the ICI channel characteristics, which are used in stage 762 to cancel the ICI effects and to output a final estimate of the transmitted symbol.

The stages 754, 756, 758, 760 and 762 each include indicia to show which of Modules A, B and C (300, 400, 500) may be utilised to perform the operations required in each of the stages. Stage 754 uses Module A 300, stage 756 uses Module B 400, stage 758 uses Module A 300, stage 760 uses modules B 400 and Module C 500, and stage 762 uses blocks from Module A 300. Schedules 702 and 750 may be summarised by the sequence ABABCA.

Figure 28:
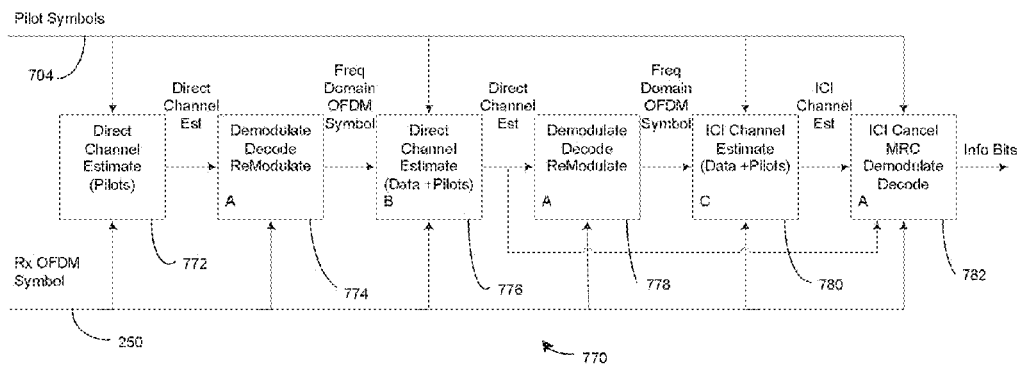
FIG. 28: illustrates an alternative schedule for prediction and removal of ICI using the modules of FIGS. 21-26.
Figure 29:
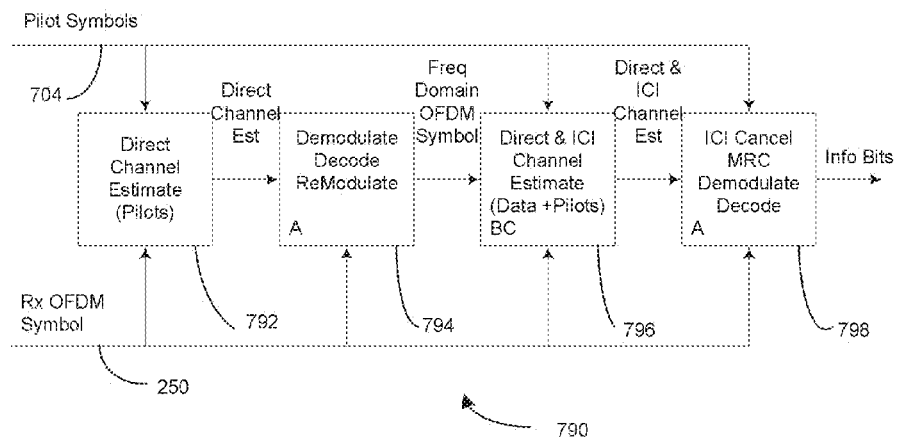
FIG. 29: illustrates a further alternative schedule for prediction and removal of ICI using the modules of FIGS. 21-26.

Alternative Schedules, FIG. 28 & FIG. 29

As the interfaces in Modules A, B, C are identical, i.e. they update a set of channel estimates and a transmitted symbol estimate, other schedules are anticipated. (The module definitions allow for zero inputs, which are encountered during the initial phases of processing).

Using the notation of a command sequence (where schedules 702 and 750 are ABABCA) further schedules may be defined, including:
A
ABA
ABCA
ABACA
ABCABCA Examples of some of these variants are shown in FIG. 28 & FIG. 29.

FIG. 28 illustrates a schedule 770 that uses the sequence ABACA. This differs from sequences 702 and 750 in that there one less update of the direct channel estimate.

Stage 772 provides an initial estimate of the direct channel based on the pilot symbols, as discussed with reference to stage 710. Stage 774 then provides a first estimate of the OFDM symbol, which is used by stage 776 to update the estimate of the direct channel. Stage 778 then updates the symbol estimate and stage 780 generates an estimate of the ICI effects. Finally, stage 782 uses the ICI estimates from stage 780 and the direct channel estimates from stage 776 to cancel the estimated ICI effects and provide a final estimate of the transmitted symbol.

FIG. 29 illustrates a schedule 790 that uses the sequence ABCA. Stage 792 provides an initial estimate of the direct channel based on the pilot symbols, as discussed with reference to stage 710. Stage 794 then provides a first estimate of the OFDM symbol, which is used by stage 796 to update the estimate of the direct channel and also to generate an ICI estimate. Stage 796 uses Modules B and C. Stage 798 uses the ICI estimates and the direct channel estimates from stage 796 to cancel the estimated ICI effects and provide a final estimate of the transmitted symbol.

3: Soft and Hard Symbol Estimates From FEC Decoder

The FEC decoder 330 in Module A 300 may output soft estimates of the encoder output bits. These soft output bits may be used to generate an estimate of the transmitted OFDM symbol. The soft bits are soft modulated 340 by computing the average position on the constellation map over the bit PDFs of the bits corresponding to the symbol. Pilot symbols (known a priori) are also inserted. The FEC decoder 330 may simultaneously output hard decisions.

Transmitted OFDM symbol estimates may be used in two ways in the receiver:
as training symbols for channel estimation in training blocks 420 and 520, and
in interference cancellation, for example in the ICI cancel and combine block 310.

In one arrangement soft symbols are used for interference cancellation and hard symbols for training. One advantage of using soft symbols for interference cancellation is that if the decoder is uncertain, the soft symbols are small, which may improve the accuracy of the interference cancellation step. If hard symbols are used for training then symbol inverses can be stored in a lookup table in the receiver, 4: Differential Update of Interference-Cancelled State Several modules may make use of the quantity $$\hat{n}[i] = r[i] - \hat{h}_{-1}[i]\hat{d}_{-1}[i] - \hat{h}_0[i]\hat{d}_0[i] - \hat{h}_{+1}[i]\hat{d}_{+1}[i]$$

which is the received symbol minus all of the signal components that are modelled. An estimate of the direct component can be obtained by adding the direct component estimate $\hat{h}_0[i]\hat{d}_0[i]$ to the noise estimate $\hat{n}[i]$. Any of the ICI terms can be generated in a similar manner.

Any update that a module makes may be in terms of a difference term caused by the subset of parameters that the module has modified.

If the ICI cancellation step needed to use further ICI terms then this noise estimate can be calculated in general as $$\hat{n}[i] = r[i] - \sum_{j \in C} \hat{h}_j[i]\hat{d}_j[i]$$

5: Use of Sync byte for FEC Priors

The performance of the FEC Module (A) 300 may be improved through use of any known encoder input bits. In the case of DVB SYNC Bytes are encoded. These will force the Convolutional Code into known states. For example, this information can be employed in both Viterbi and APP decoders of the Convolutional code. In the case of APP decoding the information bit priors are set according to the SYNC Byte values. In the case of Viterbi decoding the known bits can be used to execute terminated traceback.

6: Frequency Offset Tracking

The ICI present in the output of an FFT in the receiver system, for example FFT 48 is also reduced by feeding back local frequency-offset estimates to a pre-FFT module that corrects the time domain sequence for the measured frequency offset. This correction may be performed in a forward-only manner or retrospectively, i.e. any given OFDM symbol may be transformed through the FFT multiple times if the frequency offset estimate changes during application of the receiver.

The quantities derived as part of either of the channel estimation modules 400, 500 (Modules B and/or C) may be used to form a frequency offset estimate. In one arrangement the quantity $h_{raw}[i] = \text{inv}(\hat{d}[i]) \cdot (r[i] - \hat{h}_{-1}[i]\hat{d}_{-1}[i] - \hat{h}_{+1}[i]\hat{d}_{+1}[i])$ or $h_{raw}[i] = \text{inv}(\hat{d}[i]) \cdot r[i]$ is compared between two successive OFDM symbols to form a frequency-offset estimate. The phase change per OFDM symbol period is $$\theta[i] = \angle \Sigma h_{raw}^*[i-1] h_{raw}[i]$$

The phase change will, in general, change from OFDM symbol to symbol. In this case the time domain correction for the frequency offset can be based on an interpolation of $\theta[i]$ for a set of sample points between adjacent OFDM symbols. In this way the frequency for which the time domain signal is correct can change at a rate higher than the OFDM symbol period.

7: Reed Solomon Erasure Marking

The soft output FEC decoder 330 may be used to mark erasures for an outer Reed Solomon (RS) erasure decoder, and may improve the error correction capability of the Reed Solomon outer code. Soft outputs may be used to assign reliability to RS codeword symbols, and some number of the least reliable symbols may then be marked for erasure at the input to the RS decoder. The RS erasure decoder may run be for one or more iterations, where the number of erasures marked in each successive iteration is reduced, until some minimum value. In the case where the minimum value is zero, operation is equivalent to that of an error-correcting RS decoder. The iterative loop may be terminated early in the case when the decoder reports a successful decode. The number of iterations employed, and the number of symbols to be marked for erasure at each iterative step, may either be fixed or dynamically updated according to some system state metric.

It will be understood that the invention disclosed and defined in this specification extends to all alternative combinations of two or more of the individual features mentioned or evident from the test of the drawings. All these different combinations constitute various alternative aspects of the invention.

It will also be understood that the term "comprises" and its grammatical variants as used in this specification is equivalent to the term "includes" and should not be taken as excluding the presence of other elements or features.

The invention claimed is:

1. A pre-processor paired in use with a communications receiver, the receiver configured to receive a signal including encoded data and to extract a decoded estimate of the data, the pre-processor comprising:
an input operable to receive an input signal that is transmitted via a communication channel to the paired pre-processor and communications receiver, the input signal including first encoded data;
a channel estimator operable to estimate at least one feature of the communication channel based on the input signal and a feedback signal;
a signal modifier operable to modify the input signal dependent on the at least one estimated feature to result in a modified signal including second encoded data related to and different from the first encoded data, the signal modifier including a forward error correction (FEC) unit for deriving the feedback signal provided to the channel estimator; and
an output for providing the modified signal to the communications receiver, wherein the channel estimator and the signal modifier operate without feedback from the communications receiver.

2. A pre-processor according to claim 1 wherein said signal modifier comprises a time-domain filter.

3. A pre-processor according to claim 2 further comprising:
a coefficient calculator operable to determine one or more coefficients of said time-domain filter based on an output of said channel estimator.

4. A pre-processor according to claim 1 wherein said signal modifier modifies the input signal in the frequency domain.

5. A pre-processor according to claim 4 wherein said signal modifier comprises:
a combiner operable to combine the input signal and an output of said channel estimator.

6. A pre-processor according to claim 5 wherein said combiner is selected from the group consisting of:
a maximum ratio combiner (MRC);
a zero forcing combiner; and
a minimum mean square error combiner.

7. A pre-processor according to claim 5 wherein said channel estimator estimates the at least one feature dependent on an output of said combiner.

8. A pre-processor according to claim 5 wherein said signal modifier further comprises a modulation unit and wherein said channel estimator is driven with an output of said combiner that is demodulated and re-modulated.

9. A pre-processor according to claim 8 wherein said channel estimator is driven with an output of said combiner that is demodulated, FEC decoded, FEC re-encoded and re-modulated.

10. A pre-processor according to claim 1 wherein the communications receiver is an RF/PHY/MAC receiver and wherein, in use, said pre-processor operates between an antenna and the communications receiver.

11. A pre-processor according to claim 10 wherein said pre-processor is operable as a bridge that receives the input signal from one or more RF circuits and retransmits an output signal to the PHY/MAC communications receiver.

12. A pre-processor according to claim 1 further comprising one or more RF circuits.

13. A pre-processor according to claim 12 wherein, in use, said pre-processor operates between one or more antennas and the communications receiver.

14. A pre-processor according to claim 1 wherein, in use, said pre-processor operates between one or more RF circuits and the communications receiver.

15. A pre-processor according to claim 14 operable to bypass an acquisition circuit of the communications receiver.

16. A pre-processor according to claim 14 wherein said pre-processor processes a status and a control signal from the RF circuit and said output outputs the processed status and control signals.

17. A pre-processor according to claim 1 wherein the pre-processor is operable as a PHY module.

18. A pre-processor according to claim 17 and operable to bypass a PHY module of the communications receiver.

19. A pre-processor according to claim 1 wherein the pre-processor is operable with IEEE 802.11 compliant receivers.

20. A pre-processor according to claim 1 having a bypass mode in which the input signal passes from said input to said output with substantially no modification.

21. A pre-processor according to claim 1 further comprising:
an acquisition circuit that utilises two autocorrelations of different lengths.

22. A pre-processor according to claim 1 further comprising:
data storage storing at least one preamble for inclusion in the modified signal provided to the communications receiver.

23. A pre-processor according to claim 1 wherein at least one preamble and optionally some data symbols are passed from said input to said output.

24. A pre-processor according to claim 1 further comprising a filter for filtering a signal preamble for inclusion in the modified signal provided to the communications receiver.

25. A pre-processor according to claim 1 wherein a part of a preamble is modified or deleted before inclusion in the modified signal.

26. A pre-processor according to claim 1 wherein said output outputs a short preamble if the input signal is detected by said input.

27. A pre-processor according to claim 26 wherein said output outputs a long preamble once a timing of the input signal is acquired.

28. A pre-processor according to claim 27 wherein said output outputs the short preamble repeatedly and then outputs the long preamble once timing is acquired.

29. A pre-processor according to claim 1 wherein said input is operable to receive a plurality of input signals.

30. A pre-processor according to claim 29 comprising a selector operable to select an input signal from the plurality of input signals.

31. A pre-processor according to claim 29 wherein said channel estimator and said signal modifier operate on the plurality of input signals.

32. A pre-processor according to claim 1 wherein said signal modifier is arranged to modify the input signal dependent on a predefined capability of the communications receiver.

33. A pre-processor according to claim 1, wherein the pre-processor is arranged to expand a range of communication channels with which the communications receiver is operable.

34. A communications system comprising at least one pre-processor-enabled node comprising:
a pre-processor according to claim 1; and
the communications receiver that receives a modified signal from the paired pre-processor.

35. A communications system according to claim 34 further comprising at least one non-pre-processor-enabled node comprising a communications receiver that receives an input signal directly.

36. A communications system according to claim 34 wherein the communications system is an IEEE 802.11 network, the system comprising a delay compensator selected from the group consisting of:
a delay compensator that compensates for delay in a Pre-Processor enabled node by increasing the Coverage Class;
a delay compensator that compensates for delay in a Pre-Processor enabled node by decreasing short interframe space (SIFS) time of an IEEE 802.11 MAC/PHY;
a delay compensator that compensates for delay in a Pre-Processor enabled node by increasing SIFS time to point control function interframe space (PIFS) time;
a delay compensator that compensates for delay in a Pre-Processor enabled node by outputting signals at a higher data rate from the Pre-Processor than a data rate of the input signal received from the channel; and
a delay compensator that compensates for delay in a Pre-Processor enabled node by asserting a clear channel assessment (CCA) signal of an IEEE 802.11 MAC/PHY early.

37. The communications system of claim 34 wherein the input signal and the modified signal share substantially the same signal modulation format and multiplexing scheme.

38. The pre-processor of claim 1 wherein the feedback signal includes a time-domain feedback signal and a frequency domain feedback signal.

39. The pre-processor of claim 1 wherein the FEC unit is configured to perform forward error correction in the frequency domain.

40. The pre-processor of claim 1 wherein the input signal and the modified signal share substantially the same signal modulation format and multiplexing scheme.

41. A method of pre-processing a signal in a pre-processor paired in use with a communications receiver, the receiver configured to receive a signal including encoded data and to extract a decoded estimate of the data, said method comprising:
receiving an input signal that is transmitted via a communication channel to the paired pre-processor and communications receiver, the input signal including first encoded data;
estimating at least one feature of the communication channel based on the input signal and a feedback signal, wherein the feedback signal is derivable from a forward error correction (FEC) unit;
modifying the input signal dependent on the at least one estimated feature and a predefined capability of the communications receiver to result in a modified signal including second encoded related to and different from the first encoded data, wherein said estimating and said modifying are performed without feedback from the communications receiver; and
providing the modified signal to the communications receiver.

42. The method of claim 41 wherein the input signal and the modified signal share substantially the same signal modulation format and multiplexing scheme.

43. A computer program product comprising machine-readable program code recorded on a non-transitory machine-readable recording medium, for controlling the operation of a data processing apparatus on which the program code executes to perform a method of pre-processing a signal in a pre-processor paired in use with a communications receiver, the receiver configured to receive a signal including encoded data and to extract a decoded estimate of the data, said method comprising:
receiving an input signal that is transmitted via a communication channel to the paired pre-processor and communications receiver, the input signal including first encoded data;
estimating at least one feature of the communication channel based on the input signal and a feedback signal, wherein the feedback signal is derivable from a forward error correction (FEC) unit;
modifying the input signal dependent on the at least one estimated feature and a predefined capability of the communications receiver to result in a modified signal including second encoded data related to and different from the first encoded data, wherein said estimating and said modifying are performed without feedback from the communications receiver; and
providing the modified signal to the communications receiver.

44. The computer program product of claim 43 wherein the input signal and the modified signal share substantially the same signal modulation format and multiplexing scheme.

* * * * *